US008443924B2

(12) United States Patent
Pesenti

(10) Patent No.: US 8,443,924 B2
(45) Date of Patent: May 21, 2013

(54) THERMAL ASSISTANCE FOR BICYCLE

(75) Inventor: Yvan Philippe Gilles Pesenti, Claix (FR)

(73) Assignee: Le Commissariate a l'Energie Atomique, Paris (FR)

( * ) Notice: Subject to any disclaimer, the term of this patent is extended or adjusted under 35 U.S.C. 154(b) by 0 days.

(21) Appl. No.: 12/645,951

(22) Filed: Dec. 23, 2009

(65) Prior Publication Data

US 2010/0155167 A1    Jun. 24, 2010

Related U.S. Application Data

(63) Continuation of application No. PCT/FR2008/000900, filed on Jun. 25, 2008.

(30) Foreign Application Priority Data

Jun. 26, 2007 (FR) ...................................... 07 04566

(51) Int. Cl.
*B62K 11/00* (2006.01)

(52) U.S. Cl.
USPC ..................................... 180/205.4; 180/205.2

(58) Field of Classification Search
USPC ................ 180/205–207, 205.1, 205.2, 205.4, 180/206.1, 206.4
See application file for complete search history.

(56) References Cited

U.S. PATENT DOCUMENTS

| 2,331,976 | A | * | 10/1943 | Hare | ................................ 180/16 |
| 2,596,391 | A | * | 5/1952 | Farinelli | ........................ 180/207 |
| 3,280,932 | A | * | 10/1966 | Moulton | ........................ 180/205 |
| 4,183,418 | A | | 1/1980 | Dudas | |
| 4,397,369 | A | * | 8/1983 | Read | .............................. 180/205 |
| 4,721,177 | A | | 1/1988 | Qizhen | |
| 5,076,386 | A | * | 12/1991 | Ferneding | ..................... 180/205 |
| 5,361,863 | A | * | 11/1994 | Goodwin | ...................... 180/205 |
| 5,937,962 | A | * | 8/1999 | Yokoyama | ..................... 180/205 |
| 5,941,332 | A | * | 8/1999 | Dimick | ......................... 180/205 |

(Continued)

FOREIGN PATENT DOCUMENTS

EP    0 050 057 A    4/1982
EP    0 822 136 A    2/1998

(Continued)

OTHER PUBLICATIONS

International Search Report and Written Opinion issued by European Patent Office for priority international application PCT/FR2008/00900 (WO 2009/016284 A3).

(Continued)

*Primary Examiner* — Kevin Hurley
*Assistant Examiner* — Michael Stabley
(74) *Attorney, Agent, or Firm* — Frommer Lawrence & Haug LLP; Ronald R. Santucci

(57) ABSTRACT

A pedaling assistance device for a light vehicle, in particular a bicycle, equipped with pedals and a ratio-changing transmission, this device comprising a heat engine (1; 101; 201) equipped with a reducing gear mechanically coupled with an element (26, 46; 146; 227) receiving muscular pedaling power from a user of the light vehicle, the mechanical coupling being effected upstream of said ratio-changing transmission in such a way that the heat engine benefits from said changes of ratios, characterized in that the reducing gear of the heat engine includes a first belt-based reduction stage (6; 286).

16 Claims, 7 Drawing Sheets

U.S. PATENT DOCUMENTS

| | | | |
|---|---|---|---|
| 6,119,801 A * | 9/2000 | Yamashita et al. | 180/205 |
| 6,213,236 B1 * | 4/2001 | Yokoyama | 180/206 |
| 6,851,497 B1 * | 2/2005 | Yoshiie et al. | 180/206 |
| 6,976,551 B2 | 12/2005 | Spanski | |
| 7,284,631 B2 | 10/2007 | Rizzetto | |
| 7,770,682 B2 | 8/2010 | Spanski | |
| 2005/0039963 A1 * | 2/2005 | Forderhase | 180/205 |
| 2008/0314668 A1 * | 12/2008 | Spanski | 180/206 |

FOREIGN PATENT DOCUMENTS

| | | |
|---|---|---|
| FR | 535184 | 4/1922 |
| FR | 915817 | 11/1946 |
| GB | 381310 | 6/1932 |
| GB | 637014 | 5/1950 |
| NL | 7712692 A | 7/1978 |
| WO | WO 02/053450 A | 7/2002 |

OTHER PUBLICATIONS

Office Action in related case U.S. Appl. No. 12/645,925; mailed Nov. 24, 2010.

Office Action in related case U.S. Appl. No. 12/645,925; mailed Sep. 23, 2010.

* cited by examiner

THERMAL ASSISTANCE FOR BICYCLE

This application is a continuation of International Application PCT/FR2008/000900 filed Jun. 25, 2008 entitled "Internal Combustion Assist Means for a Bicycle", published on Feb. 5, 2009 under publication number WO 2009/016284 A and claims priority to French Patent Application Number 0704566 filed Jun. 26, 2007, the disclosures of each are herein incorporated by reference.

FIELD OF THE INVENTION

For a few years, we have been seeing a growing number of bicycles assisted by electric motor coming onto the market. These bicycles are actually designed for the cyclist to work with his assistance and the electric motor cannot move the bicycle on its own, as in prior embodiments. The input from the cyclist makes it possible to extend the action radius by a little, whereas the assistance provides the user with the sensation of being very fit.

These vehicles are far from being all equivalent in their effectiveness; they differ by their motor, the kinematics through which it acts, the management of the assistance, the batteries and the bicycle on which the assistance is mounted.

The motors of this type of vehicle nearly all have a rated power of approximately 200 watts, or the equivalent of what the occasional cyclist can give at his maximum. On the other hand, they differ by their speed of rotation, their torque curve, their efficiency curve, their cooling, their noise, their weight and their price.

However, with regard to our concerns, we will say that they are all fairly close and share essential qualities for this assistance work. They start on their own, offer a significant torque on stopping and at low speeds, often revolve slowly (some are even directly geared), are fairly silent, vibrate little, and have a fairly good efficiency provided that they are not made to rotate too slowly.

All these qualities, we should say immediately, are cruelly lacking on heat engines.

The kinematics of the assistance motor is a crucial point of difference between these bicycles.

On many of these assistances, the motor has a single transmission ratio, which means that it can deliver its rated power only at a single speed (often 25 km/h). The consequence of this arrangement is that the assistance power drops with the speed, which is a nuisance in head winds and dramatic on climbs. This problem is reinforced by a drop in the efficiency (reduction of the autonomy) and a motor which will rapidly overheat, so much so that these bicycles are unsuited to reliefs, even if the kinematics of the cyclist offers a number of ratios.

On another, much more sophisticated, family of assistance, the motor will benefit from the changes of ratio of the cyclist, so that the cyclist and the motor can continue their good collaboration over the entire range of variation of the ratios of the bicycle.

The management of the assistance is also of prime importance. To satisfy certain laws, the motor must not operate if the cyclist is not pedaling, which is, moreover, the definition of an assistance. In fact, some bicycles do not obey this rule, but the low installed power limits to very few occasions when the bicycle is used without pedaling.

It is very tempting to think that the assistances based on a measurement of the torque exerted on the pedal, with a proportional response from the motor, provide the most appropriate system. A finer approach shows that the torque that a cyclist exerts on his pedal is sinusoidal and, without any special arrangement, the response from the motor will also be sinusoidal over a pedal revolution. This detail deprives these bicycles of a huge advantage that the assistances could provide. In practice, if, on the flat, the inertia of the bicycle makes these torque variations insensitive, the same does not apply when climbing. There, the bicycle slows down at each dead point of the pedal to then accelerate. This is the reason why our average pedaling speed decreases when climbing and it is also the reason why, given equal power, pedaling on a slope is more trying than on the flat. This torque variation is also highly unfavorable to road holding, a particularly sensitive detail on all-terrain bicycles which have very limited capabilities in this respect.

Without going into the details, good management of the assistance gives a constant torque over a pedal revolution. This gives a constant torque bottom that makes it possible to easily pass the dead points of the pedal, and this considerable "rounds" the pedal stroke when climbing and when starting. The effect goes well beyond the added power, because it enables the cyclist to obtain, on a slope, a pedaling efficiency close to that of the flat.

The batteries are the enormous weakness of these vehicles, despite recent advances in the field and the basic research does not give room to hope for storage greater than 200 Wh/kg. In reality, we are very far from that because the energy storage depends on a large number of parameters: the temperature, the power drawn, the age of the battery, the number of recharges already made, the storage durations and the recharging modes. In reality, the best batteries offer an average of approximately 100 Wh/kg over two years of use.

If we use the analogy with a liquid fuel, even by taking into account the efficiency difference between an electric motor and a heat engine, a kilo of battery is at best equivalent to a 50 $cm^3$ tank that would have to be drip-fed for at least four hours, that would shrink on each filling, that would leak when it is not being used, that would generally burst after three years, in which the calorific value of the fuel would drop with its level, and that would be produced in a non-recyclable, very precious metal.

This analogy, which seems like a caricature, defines the challenge that these bicycles have to overcome.

It should be noted that a kilo of lithium-ion battery costs approximately 200 euros (2007) and it will store, at best, in its life, 500×100 wh, or 50 kwh, or approximately 5 euros of energy. The price of the storage is therefore 40 times the price of the stored energy.

This detail becomes apparent in all its cruelty when the user has to change his battery (generally after two to three seasons) and surveys show that the life of said bicycle often stops there.

All this means that these bicycles carry with them a derisory quantity of energy, approximately one hour at rated power. In some countries, laws dictate that these bicycles have maximum speeds (25 to 32 km/h), and indeed, most of these assistances are cut off at 18 km/h to save on energy and there is then no assistance on starting. This makes it possible, depending on the manufacturer's measurement protocol, to announce autonomies that sometimes exceed 80 kms. In truth, most of this distance will be covered with zero or very low assistance. When climbing, for those bicycles that are capable thereof, the autonomy generally remains less than 10 kms.

This is truly regrettable, because some of these vehicles are truly successful, their user-friendliness is such that it would be possible to be unaware that you were on a motorized vehicle and only think that you were in dazzling form. In towns they make it possible to cover ten or so kilometers in hot conditions without perspiring, and there is less hesitation to brake or stop when starting is easy, which is all for the benefit of safety. We would say, for the best of them, that they are formidable . . . for one hour. This represents a very restricted use, prohibits any trips, and greatly limits their circulation.

The idea of a bicycle assisted with liquid fuel sourced from fossil or vegetable matter resolves all the energy storage problems, but the current heat engines do not have any of the characteristics specific to electric motors.

They do not start on their own, they have a minimum slowing down speed, have little torque at very low speeds, this torque is highly variable over the cycle of the engine, they have a restricted range of use, a fairly low and variable efficiency depending on the load and speed, they overheat a lot, vibrate, make a lot of noise and can be highly polluting. However, they are the only ones whose technology is truly known, that are easy to implement and economical to produce. Also, later we will see some arrangements that make it possible to resolve or mitigate most of these drawbacks. These arrangements will make it possible to design a particularly agreeable vehicle, with surprising overall efficiency and astonishing discretion.

To want to bring together the user-friendliness of an electrically-assisted bicycle with a thermal assistance is not an easy objective. Each element must satisfy multiple constraints (notably function, weight, layout, ergonomics, efficiency, noise, vibration, compatibility with bicycle transmission, price), and these constraints are so important that some elements will hereinafter be described several times through each of these aspects.

STATE OF THE ART

Thousands of patents deal with bicycles equipped with a heat engine, but in most cases, the engine is intended to replace the pedaling. Collaboration is impossible, or possible only in very specific circumstances, for example when climbing at very low speed or when starting up.

Many conditions are necessary for permanent collaboration between the cyclist and his assistance to be possible and there will be many more thereof if we want this collaboration to be effective and harmonious and give good efficiency.

The first is that the respective transmission ratios of the cyclist and of the assistance are compatible over the entire speed range of the vehicle. This first condition limits the number of relevant patents to a few dozen. It would be quite difficult to give a summary here of the scope of these patents. We will therefore try to cite them within the limits of our knowledge as we progress through the general description that follows, when they seem relevant to us.

Without going into the fairly complex details that define the physiological efficiency of pedaling, we can state that the maximum efficiency of an occasional cyclist (who does not reach 0.2), lies at approximately 60 to 70 pedal revolutions per minute and his continuous maximum power at approximately 80 to 90 rpm.

Modern bicycle transmissions offer a large number of ratios and a big range of variation that can exceed 6, which means that they enable a cyclist to remain at his maximum efficiency for speeds ranging for example from 7 to 42 km/h. We will consider that they are fairly optimal, for most of the conditions encountered. The bicycle will therefore be equipped therewith.

The maximum efficiency of conventional heat engines fairly easily exceeds 0.25, so it is greater than human efficiency, but remains fairly low and this gives a great release of heat that must be treated correctly.

This efficiency is maximum only at full load and over a fairly narrow speed range and it bottoms out rapidly outside of these conditions. Note that the maximum efficiency speed is always close to the maximum torque speed.

The full load condition is fairly easy to resolve; it is sufficient for there to be almost never any excess power, and therefore for the installed power to be very low. This detail goes in the right direction, because with high power, the input from the cyclist would very quickly become negligible and superfluous.

The condition of holding to the maximum efficiency speed range is more difficult; it excludes all the single-transmission ratio kinematics, especially as, with low power, the speed of the vehicle will be extremely variable with the wind or the gradients encountered. (This condition considerably reduces the number of relevant patents.)

The first possible solution for resolving this problem is the variable speed drive, centrifugal or driven. This possible solution poses difficult technical problems in its application to the assisted bicycle.

Another fairly elegant solution is to use, for the engine, the change of speed of the cyclist, which is possible when the added power is low. In this case, the speed of rotation of the engine is proportionally linked to that of the pedaling.

It is then sufficient to choose the appropriate reduction ratio, so that the maximum engine efficiency speed broadly corresponds to the cyclist's maximum pedaling efficiency speed.

We immediately see that there would also be great interest in having the maximum power speeds also correspond. This is possible if the engine is defined to have the same ratios between maximum efficiency speeds and maximum power speeds as the cyclist, or approximately 65/85=0.76, which is quite possible.

Thus, the cyclist will manage his speeds as he has always done for himself, while placing the engine in the best arrangements to perform its work. Also, since man is by nature particularly economic in his energy management, when it is he who has to provide it, this leads to an assistance management system that is free and particularly optimized regarding the engine speed aspect, which is vitally important with a heat engine. This arrangement, accompanied by a low installed power which guarantees strong charge for the engine, leads to an installation that will mostly be used at its optimum efficiency.

As an indication, a comfortable bicycle (very straight position) equipped with large and underinflated tires may, despite everything, exceed 35 km/h, with 400 watts of power (with the same power, a racing bicycle reaches 50 km/h). These 400 watts can be distributed at 100 watts for the cyclist (very low) and 300 watts for the assistance. To supply these 300 watts to the bicycle, we will assume that the engine must supply 360 watts (a half horse power) to compensate for the transmission losses.

Good heat engines can reach an efficiency of 180 g of fuel per horse power per hour. Since we want a simple engine that will not always be exactly at its maximum efficiency, we will consider that it will use on average 220 g.hp.h, or 110 g of fuel per hour for our 360 watt engine.

It will take approximately 3 hours for our bicycle to cover 100 km, so its consumption will be 330 g of fuel, or a little under 0.5 liter if it is petrol, or the astonishing value of 12 g of $CO_2$/km (in this area, the best cycle engines do not drop below 60 g of $CO_2$/km).

Note that, despite assumptions that are always highly unfavorable, this value is not within the scope of an electric bicycle, unless the electricity is of nuclear or renewable source.

This idea is not truly novel since we can find traces of it at the start of the century in French patent No. 535 184, then later in the French patent No. 915 817, then notably in the U.S. Pat. No. 3,280,932, GB 637 014, U.S. Pat. No. 4,397,369, U.S. Pat. No. 5,076,386, U.S. Pat. No. 5,361,863, U.S. Pat. No. 5,941,332, EP 0 822 136 A2. And yet, very few productions have used this theoretically highly attractive technique.

A first aspect of the invention relates to a pedaling assistance device, defined by claim 1. It relates to a pedaling assistance device for a light vehicle, in particular a bicycle, that is to say that it relates to an assistance device intended to be mounted on a light vehicle to assist a user in supplying a force making it possible to move the light vehicle. The light vehicle is equipped with pedals and a ratio-changing transmission. The assistance device comprises a heat engine equipped with a reducing gear mechanically coupled with an element receiving muscular pedaling power from the user of the light vehicle. The mechanical coupling between the reducing gear and the element receiving the muscular pedaling power from the user of the light vehicle is effected upstream of the ratio-changing transmission in such a way that the heat engine benefits from said changes of ratios. The reducing gear of the heat engine includes a first belt-based reduction stage.

The belt may be a notched belt.

The pitch of the notched belt may be less than or equal to 5.08 mm.

The belt may be a flat belt, notably a striated flat belt, for example of the "poly V" (registered trade mark) type.

The first reduction stage may include a roller-based belt tensioner.

A torsion-flexible element may keep the center-to-center distance of two pulleys of the first reduction stage almost constant, by allowing the heat engine some light vibratory movement. The torsion-flexible element may be a freely-rotating link rod, articulated about the output axis of the first reduction stage.

The engine may be free to rotate in the flexible element.

The axis of the flexible element may be placed at least roughly in a direction of the weakest vibration of the engine.

The torsion-flexible element may constitute a protection and sound-proofing casing for the first reduction stage.

The volume of the protection and sound-proofing casing may constitute an air box for damping the intake noises of the heat engine.

The first reduction stage may comprise rollers for twisting the belt to form an angle between the axes of the pulleys of the first reduction stage.

The angle may have a value of at least roughly 90°.

The device may be intended to be fixed on a bicycle and able to position the heat engine behind a saddle of the bicycle and above a rear wheel of the bicycle and in that the reducing gear comprises means of routing the power from the heat engine to a peddler of the bike.

The device may comprise means of positioning the heat engine and the primary transmission outside a bicycle pedaling area.

The device may comprise means of positioning the heat engine in a position that is offset relative to a median longitudinal plane of the bicycle, so as to bring the first reduction stage closer to the median plane of the bicycle, a portion of the first reduction stage being located in the pedaling area and the heat engine being outside the pedaling area.

An output axis of the first reduction stage may be mechanically coupled to an intermediate reduction stage, the intermediate reduction stage being positioned relative to the first reduction stage in such a way that, once the device is fixed to a bicycle, the intermediate reduction stage is located closer to the median longitudinal plane of the bicycle than the first reduction stage is.

The intermediate reduction stage may be arranged so that, once the device is fixed to a bicycle, the intermediate reduction stage is located in the median plane, behind the tube supporting the saddle tube of the bicycle and in front of the rear wheel of the bicycle.

The intermediate reduction stage may be arranged so that, once the device is fixed to a bicycle, the intermediate reduction stage is arranged laterally and as close as possible to the tube supporting the saddle tube of the bicycle and/or the rear wheel of the bicycle.

The device may comprise one or more notched belt-based intermediate reduction stages.

The device may comprise one or more flat belt-based intermediate reduction stages, notably with a striated flat belt, for example of the "poly V" (registered trade mark) type.

The device may comprise one or more intermediate reduction stages placed under a casing.

The casing may be intended to be fixed rigidly to the frame of the bicycle.

The casing may be intended to be fixed rigidly to the tube supporting the saddle tube of the bicycle, for example by clamping on the latter.

The casing may comprise a sleeve concentric with a power input shaft in said casing, on which is mounted, freely rotating, a torsion-flexible element keeping the center-to-center distance of the two pulleys of the first reduction stage almost constant.

The casing may support the heat engine via elastic fixings.

The volume of the casing may be used as an air box for the intake of the heat engine.

The air may enter into the casing through a calibrated tube to attenuate some noise frequencies.

The casing may include pins for rigidifying its sides so as to attenuate their vibrations.

A first air filter may be located on an air inlet of the casing and/or a second air filter may be located between the casing and the air intake of the heat engine.

The casing may comprise a concave or flat bottom face intended to provide a mudguard function.

The casing, which is extended by a hollow beam, may fulfil the functions of holding baggage and/or channeling cooling air for the heat engine and/or supporting a exhaust muffler and/or supporting a heat exchanger and/or supporting a carburetor.

The casing may support a jacket encapsulating the engine.

The reducing gear may comprise a last chain-based reduction stage.

The last chain-based stage may have a large wheel made of plastic material, preferably perforated, so as to damp the cyclic vibratory torque variations.

The chain may have a pitch of 7.6 mm.

The chain may be of double or triple type.

The last reduction stage may include a roller- or runner-based chain tensioner.

The tensioner may tension a slack side of the chain by an elastic means.

The reducing gear may comprise a last notched belt-based reduction stage.

The reducing gear may comprise a last reduction stage with gear trains.

The output of the last reduction stage may transmit its movement via a first free wheel to a spacer concentric to the bottom bracket axle, on which is placed a chain ring mounting of the bicycle.

Cranks of the bicycle may transmit a pedaling power to the spacer-chain ring mounting assembly via a second free wheel that provides the junction of the pedaling power and of the engine power.

The second free wheel may comprise a ring gear joined to the chain ring mounting.

The second free wheel may form part of a free wheel pinion of standard type for bicycles and is screwed to abut on a crank and in that teeth of the free wheel pinion collaborate with the screw heads of the chain ring mounting, the heads and the teeth forming the junction of the pedaling power and of the engine power.

The first free wheel may be the free wheel of a free wheel pinion of standard type for bicycles and is screwed to abut against a shoulder of the spacer.

The bottom bracket axle rotates in the spacer on bearings, in particular smooth bearings made of antifriction plastic or of polytetrafluoroethylene-coated metal.

One of the cranks may be include means of clamping the crank onto splines formed on the bottom bracket axle so as to allow the axial play of the bottom bracket axle-cranks assembly to be adjusted inside the spacer.

The spacer may be mounted on rolling bearings in a bottom bracket shell of a bicycle frame.

The first free wheel may be located on one side of the frame of the bicycle and in that the second free wheel is located on the other side of the frame of the bicycle.

The spacer may rotate in a bottom bracket shell that forms part of the frame of the bicycle.

The reducing gear may be intended to be fixed to a frame of a bicycle and able to transmit the power of a heat engine positioned in front of the pedal of the bicycle and in that the reducing gear comprises means of routing the power from the heat engine to the pedal of the bicycle.

A casing may incorporate the bottom bracket axle and all the reduction stages apart from the first reduction stage.

The different reduction stages of this casing may be organized between two axes, one of them being the bottom bracket axle.

Mechanical power may enter into the casing at the level of the bottom bracket axle.

The mechanical power may enter into the casing at the level of the other axis.

The casing may include three notched belt-based reduction stages.

The casing may comprise two reduction stages.

The two reduction stages may be geared.

The two reduction stages may be notched belt-based.

The large pulley of the first reduction stage may comprise an axial offset, the internal face of the hub of a crank being fixed to the bottom bracket axle in this axial offset.

The device may be intended to be fixed to a bicycle and able to position the heat engine behind a saddle of the bicycle and above a rear wheel of the bicycle and in that the reducing gear comprises means of routing the power from the heat engine to the axis of the free wheel on the power input of a hub comprising a ratio-changing epicycloidal means.

The second and last reduction stage may be notched belt-based.

The second and last reduction stage may be chain-based.

The chain may have a pitch of 7.6 mm.

The chain may be of the double or triple type.

The large ring gear of the last stage may be made of plastic material, and preferably of perforated plastic material, so as to damp the cyclic torque variations.

According to the invention, a light vehicle, in particular a bicycle, comprises an assistance device as defined above.

A second aspect of the invention relates to a pedaling assistance device for a light vehicle, in particular a bicycle, the device comprising a heat engine and a servomotor acting on a throttle control of the heat engine.

The device may comprise a manual control lever, stable in position, acting in series or in parallel, via the servomotor, on the throttle control.

The device may comprise a crank rotation detector for the light vehicle, the detector interacting with a ring gear joined to a crank or to a crankshaft.

The servomotor may operate in all-or-nothing mode and chops the throttles, regardless of the position of the manual control lever, when pedaling is stopped or backward pedaling is detected by the rotation detector.

The device may comprise means of measuring stresses on a frame of the light vehicle and calculation means for determining the pedaling forces from the stresses measured on the frame.

The servomotor may adapt a throttle control set point as a function of the value of the determined pedaling forces, when the cranks rotate forward.

The device may comprise a crank angular position detector.

The measurement of the pedaling forces may be effected in defined angular positions of the cranks.

The device may comprise a processing logic unit which receives, notably from sensors, the following information: pedaling and/or direction of pedaling and/or braking and/or angular position of the cranks and/or pedaling forces and/or rotation of the heat engine and/or temperature of the heat engine and/or oil pressure and/or pedaling rate and/or inclination of the device and/or desired pedaling set point.

The processing logic unit may monitor the throttle control and/or monitors the enrichment of the heat engine and/or controls the changes of gear ratio of the light vehicle and/or controls the stopping of the engine and/or defines the average pedaling rates of a user and/or displays the operating durations and/or displays maintenance information and/or displays, by an indicator, the running of the heat engine and/or displays the power developed by the user of the light vehicle.

A thermocontact may be placed close to a centrifugal clutch of the heat engine and stops the heat engine if a temperature rises above a predetermined threshold.

According to the invention, a light vehicle, in particular a bicycle, comprises an assistance device as defined above.

A second invention relates to a pedaling assistance device with heat engine, for a bicycle equipped with a transmission with several ratios, comprising a junction of the two power sources situated in front of said transmission with several ratios. The assistance device comprises a torque limiter placed on the kinematics of the engine between the engine and the junction of the two power sources.

A third invention relates to a pedaling assistance device for a light vehicle, in particular a bicycle, equipped with pedals and a transmission, this assistance device comprising a heat engine equipped with a reducing gear mechanically coupled with an element receiving muscular pedaling power from a user of the light vehicle. The assistance device comprises a jacket encapsulating the heat engine.

A fourth invention relates to a pedaling assistance device for a light vehicle, in particular a bicycle, equipped with pedals and a ratio-changing transmission, this device comprising a heat engine equipped with a centrifugal clutch and a reducing gear mechanically coupled with an element receiving muscular pedaling power from a user of the light vehicle, the mechanical coupling being effected upstream of said ratio-changing transmission so that the heat engine benefits from said changes of ratio. The engine supplies at least 80% of its maximum torque at the speed of locking of the clutch.

Obviously, the four inventions can be combined together to define a particularly advantageous pedaling assistance device. To this end, excluding technological incompatibility, any one of the embodiments of a device according to one invention can be combined with any one of the embodiments of a device according to another invention. One embodiment combining the various inventions is described later with reference to the figures.

Arrangements Reducing the Stresses on the Kinematics Chain:

Questions can legitimately be raised as to the life span of a bicycle transmission, with extra power input.

A good quality bicycle transmission can support the power of a sprint, which can reach 1000 watts, or close to 2000 watts in instantaneous power. It is these instantaneous power variations that most test the transmission. In a first approach, given equal power, the instantaneous power will be far more constant on an assisted bicycle than on a conventional bicycle. Provided that the background assistance is constant and this should lead to a rather better transmission life span.

In reality, this does not apply, and certain phenomena can even lead to transmission breakdowns, because this technique has serious stumbling blocks.

The first is that the piston engines generate a variable torque over their cycle which tests the transmissions, well beyond the power to be transmitted.

And if these torque variations are not filtered before their arrival at the bicycle transmission, the life span of the latter will be greatly shortened.

The second stumbling block relates to the ratio changes. One of the major advances in modern bicycle transmissions is that they now allow for changes of ratio under load, which will enormously simplify the driving of the apparatus.

Whether the ratio change is effected with dérailleurs or with epicycloidal hubs, the transition from one transmission ratio to a lower transmission ratio will take place very well.

However, it is quite different when changing from one transmission ratio to a higher transmission ratio. In this case, the engine and its transmission will have to undergo an instantaneous drop in their speeds and the kinetic energy variation will have to pass through the entire transmission, to the rear wheel. In terms of sensation, this is reflected in a bump, which will be all the more violent if using a low transmission ratio.

For the transmission, the impact is equivalent on all the transmission ratios, it depends primarily on the rate of variation of the change of ratios and the inertia of the engine and of its transmission. In this type of ratio changing, several times the rated power can pass through the transmission.

We see here that, without special arrangements, a loading of the engine flywheel in order to regulate the engine torque has a quite perverse effect on the transmission.

The phenomenon is destructive for the entire kinematic chain, and even if we succeed in having these instantaneous powers arrive as far as the transmission of the bicycle, it is the transmission that will suffer with, in the best of cases, a very short life span. However, more often than not, it will have to be combined with deterioration to gearwheels, broken gear trains, broken ratio changing ratchets, chains, free wheels, spokes, valves torn out by tires that sometimes run on their rim.

The worst scenario is encountered with epicycloidal hub transmissions. Their gear trains offer very little damping, and also these transmissions generally offer few ratios and a large rate of variation between each of them. On this type of wheel, the hub is generally of a large diameter, which confers a much greater rigidity on the spoke configuration. This characteristic, normally sought, further aggravates the situation regarding these impacts, because the very rigid wheel in truth does little damping. The whole leads more often than not to very rapid breakdowns.

The situation with a dérailleur transmission is scarcely better; the impacts are a little less violent, but the chains are narrower and therefore less solid and the high transmission ratios are obtained with tiny gear wheels, in which the few engaged teeth will suffer terribly from the situation.

On the other hand, the large number of ratios will make it possible to reduce the difference between two transmission ratios and this will be particularly advantageous with the small gear wheels which will advantageously be spaced apart by a single tooth.

The value of this instantaneous power will also depend on the rigidity of the reducing gear, the worst solution being based on non-damped gear trains. The elasticity of the reduction may improve the situation a little, but it is difficult to spread the excess kinetic energy over a sufficient duration. Moreover, a very strong elasticity leads to a fairly disagreeable oscillation of the engine speed on each change of ratios, even on each pedal stroke, and these oscillations will also occur in all terrains on passing over each stone or irregularity, which is a great nuisance and generates wide torque variations throughout the kinematic chain. This scenario is very probably encountered in the device described in U.S. Pat. No. 5,941,332.

In the device according to the invention, a torque limiter will make it possible to correctly dissipate the excess kinematic energy.

Note that the centrifugal clutch with which the assistance will be equipped must engage, at worst, at approximately 50 rpm pedal speed, and it is at a very much higher speed that we opt for a longer transmission ratio. The clutch will therefore be firmly locked at this moment and will not be able to correctly fulfill the role of torque limiter.

From a mechanical point of view, a hydraulic converter would offer a fairly ideal smoothness, but the weight, the cost and the efficiency loss would make it difficult to apply.

A mechanical torque limiter with friction will advantageously find its place on the assistance kinematics, between the engine and the junction of the two power sources. This torque limiter will be all the lighter the closer it is to the engine, its efficiency will be all the better the closer it is to the junction, because it will then absorb the kinetic energy of all of the reducing gear. Despite everything, most of the kinetic energy originates from the engine and a limiter placed on the latter will already give excellent results. A good compromise may be to place it at the output of the first reduction stage, where the torque is not yet very strong and installation is easy.

Calibration of this torque limiter will enable it to transmit practically the maximum torque from the engine.

Friction limiters always have a releasing torque greater than their sticking torque, and a slightly flexible transmission will further enhance the comfort and effectiveness of the solution.

It should be noted that it is possible to produce limiters based on leather or equivalents for the friction packing. This material gives the limiter intermediate characteristics between visco-coupling and dry friction. The limiter will thus often have a slight permanent slip, but it will offer very gentle damping.

Equipped in this way, the bicycle transmissions have not only their reliability restored but also a life span comparable to that of a conventional bicycle. This is due to the fact that, at equivalent power, the power variations over a pedal revolution are much smaller than on a conventional bicycle, where the instantaneous power can reach twice the continuous power.

We will look later at a hydraulic version of the transmission, in which the heat engine drives a pump that feeds a slow hydraulic engine. This solution does not exempt the apparatus from a torque limiter, the latter may be mechanical as described previously. Obviously, the hydraulic motor will be slow and will probably not require any reduction, which dictates a high capacity torque limiter. However, this limiter can also be a discharge valve.

Vibration Noises:

When equipped in this way, we will have a bicycle with exceptional efficiency on all types of terrain, but which will make a noise of approximately 90 decibels at the level of its user's ears, even if it is type approved as a European moped and emits 79 dB at 7.5 meters and 30 km/h. This sound level, acceptable for a moped, will rapidly tire the user who becomes very demanding as soon as he starts to pedal.

In effect, for most individuals, the action of pedaling is associated with the bicycle and a bicycle makes no noise.

In reality, at 30 km/h on a pure bicycle, the noise is approximately 60 dB at ear level, but this noise falls very quickly with speed because the noises are essentially aerodynamically originated.

The object of 60 dB at 30 km/h at ear level on our assisted bicycle, or even better, is possible. However, this requires significant work on most of the bicycle's noise sources.

Note that, at 100 km/h, the noise inside a luxury sudan is at best 65 dB and that 60 dB at ear level corresponds to approximately 50 dB according to the usual type approval measurement protocol for vehicles.

It is naturally desirable for the assisted bicycle to be as light as possible, so as to be powerful, handleable and easily transportable. This makes the challenge of very low sound emissions that much more difficult to achieve because lightness is a great friend of noise.

The minimum condition for a sound emission objective to be reached is already that none of the noise sources exceed the target value and this minimum condition is generally not sufficient. We would say that it is the noise at the ears of the user that is important to us.

The noise source that is easiest to deal with is the vehicle exhaust. The formulae are known and if the sound muffler is given the desirable length and volume, the result is relatively easy to obtain with the low powers that we envisage. Only the layout is problematical because there is no question of degrading the ergonomics of the bicycle, nor of provoking risks of burns in routine use. All the same, it is desirable to direct the sound waves in a direction that is not very detrimental to the ears. Later, we will give layout solutions that are compatible with the desirable volume.

The serious intake noises are already far more problematical to damp. A significant and very rigid volume is necessary, and this is not necessarily easy to find or place on a bicycle, especially if there is a desire not to weigh the bicycle down and compromise the esthetics. In some cases, the volume of certain portions of the frame may be used. We will see later, in a particular embodiment, that this air box can be formed by the reducing gear casing(s) of the engine.

The vibrations and mechanical noises emitted by the engine and its reducing gear pose much more difficult problems when very low sound levels are targeted.

For the engine, the vibrations mainly originate from two quite distinct sources.

The first originates from the engine torque variations over the thermodynamic cycle, one revolution for a two stroke and two revolutions for a four stroke. This is a vibration that tends to make the engine oscillate about its axis in time with the explosions, which we will call cycle vibrations.

The second originates from the imbalance of the inertias of certain moving parts when the engine rotates, which we will call mechanical vibrations.

These vibrations generate not only noise, but also a mechanical nuisance for the cyclist. They are therefore an irritant for the ears, but also for all the points of contact between the cyclist and his bicycle. These points are, in order of sensitivity, the hands, the feet and the buttocks.

It is therefore desirable for these vibrations to be as weak as possible and for their intensity to decrease from the saddle to the pedal, then the handlebar.

We will see later how it is advantageous to have the junction of the two power sources on the pedal. It is therefore very tempting to design a gear motor block including the pedal, as in the patents FR No. 915 817, U.S. Pat. No. 6,213,236, EP 0 822 136 A2.

However, this solution will generate a maximum of vibration in the pedal, which is already not very favorable. To avoid having these vibrations transmitted to all of the frame of the bicycle, it would be necessary for the gear motor block to be mounted elastically on the frame as in the patent EP 0 822 136 and for the frame to be much heavier than the gear motor block, which will be difficult. Failing this, it is the cyclist who will serve as the weight, which is precisely what we want to avoid. Moreover, this elasticity must be compatible with the pedaling forces which are considerable, which is also highly unfavorable. Finally, any elasticity of the pedal will be reflected in a loss of pedaling efficiency which is regrettable. This configuration is therefore particularly unfavorable for achieving our objectives.

In order to greatly attenuate the cycle vibrations, it would be necessary for our engine to have a large number of cylinders, and if possible more than four with 4 stroke or more than two with 2 stroke, which, economically, will be more than difficult.

All the same, it should be noted that some two-cylinder solutions present numerous advantages in terms of mechanical balancing, while reducing the cycle vibration value by approximately a half, but the price will doubtless be prohibitive.

This vibration is understood to be an action/reaction of the engine casing to the mobile equipment. It is generally maximum when slowing down, since at this speed the engine is very close to stalling on each compression. It can also be very strong if a high load is demanded at very low speed, and the engine is then said to knock.

When the engine is engaged, it is propagated in two modes, the engine casing transmits its oscillations to the frame of the bicycle, whereas the crankshaft propagates its torque variations through the entire transmission to the drive wheel.

This is why a single-cylinder heat engine requires a far more solid transmission than an electric motor.

In our case, this is not limited to an excess weight and an excess cost, but this is also paid for in noise and wear of the bicycle transmission.

It is therefore particularly advantageous to spread these vibrations. Thus, it will be best for the fixing and the coupling of the engine to allow a slight rotation of the engine about its axis. Similarly, the transmission will have an elasticity capable of clipping these cyclical torque variations.

For cost reasons, the engine of the vehicle can be a very basic single-cylinder, without any balancing device other than its crankshaft, which will therefore generate major mechanical vibrations.

To limit these vibrations, the weight of the parts generating the vibrations must be reduced to the maximum, which is generally done, and the weight of the fixed parts must be increased as much as possible. However, our possibilities in this area are extremely limited, since any addition of weight is very detrimental to the dynamic qualities of the vehicle.

We therefore have a particular interest in filtering these vibrations.

However, to effectively filter these vibrations, the elastic elements that support the engine must be fixed to a significant weight.

Since we want a minimum of vibrations to reach the cyclist, it is the bicycle mass/vibrating mass ratio that we will have to adjust.

A more detailed vibratory analysis of the bicycle shows that it is impossible to consider the bicycle as a lumped mass and that it must be likened to a sum of masses that are elastically linked together. This means that most of these masses have a very weak inertial role with regard to the vibrations that we want to deal with, which is also unfavorable.

Our margin for maneuver is therefore small. One very effective course of action remains, one that consists in a coupling or a primary power transmission that allows the movements that are needed to damp the vibrations of the engine. This makes it possible to rigidly fix the reducing gear to the frame, which clearly improves the bicycle mass/vibrating masses ratio. This ratio can be further reinforced by moving certain elements of the engine to the bicycle, such as, for example, the exhaust system, the carburetor, the ignition coil, the oil tank, the fuel tank, any soundproofing hood.

This lightening of the engine causes it to vibrate with greater amplitude, but the phenomenon can be more than compensated by the increased effectiveness of the elastic fixings if the fixed mass/vibrating mass ratio becomes sufficiently favorable. And that will be the case, unless a particularly heavy engine and a particularly light frame are used (some frames weigh less than 1 kg).

The benefit of this technique is that it allows for a vibratory gain, given equal mass.

There are a large number of coupling solutions capable of giving the engine desirable degrees of freedom to make it possible to damp the vibrations. However, these solutions have a mass that is not inconsiderable, they sometimes cause a drop in efficiency and have a bulk that often poses serious layout problems that we will discuss in the layout section.

Curiously, it is precisely to resolve a layout problem that we find one of these solutions in the U.S. Pat. No. 5,941,332. In this patent, the engine is longitudinal and placed behind the saddle, and it transmits its power to the reducing gear via a flexible coupling with torsion cable.

The excellent aim of this is to not degrade the ergonomics of the bicycle. However, it is a great shame that this solution is not accompanied by elastic elements for fixing the engine. Note also that no accessory has been transferred to the frame.

This longitudinal arrangement greatly simplifies the layout problems, and it is also found in the patents GB No. 381 310, EP No. 0 822 136 A2, but it imposes the need for an angle transmission.

In the U.S. Pat. No. 5,941,332, this angle transmission is a worm screw, and this solution is particularly silent. It is a shame that it is accompanied by other gear trains, but it does not seem that the noise and the vibrations were a concern. However, this solution has a deplorable efficiency which is in this case aggravated by the efficiency of the flexible coupler, which is also not good. In this precise case, it is probable that more than half of the engine power leaves as heat before arriving at the rear wheel. Moreover, this transmission is not reversible, which will block the rear wheel in a reverse maneuver. Finally, this type of flexible coupler is very heavy, especially if the aim is for it to withstand the power peaks from the changes of ratio described previously and its excessively weak rigidity torsion-wise will doubtless generate the oscillatory phenomena described previously.

The longitudinal axis engine solution hugely simplifies the layout problems and makes it possible to fit all kinds of couplers, but it imposes the need for an angle transmission which will be very difficult to silence if it is made up of angular bevel gears, and, moreover, the solution will be heavy and costly. Much of its interest is therefore eliminated.

Note that, if the angle transmission cannot be avoided, it will be wise not to use it on the first stage of the reducing gear, which is the fastest and therefore the noisiest.

We will propose later a belt-driven angle transmission that can be lightweight, economical and silent, but this solution greatly tests said belts.

One fairly particular solution in our case has a fairly large number of advantages; the first stage of the reducing gear is the fastest and therefore the most difficult to soundproof, and the torque therein is also low. There is a great interest in producing it based on a belt, and if this belt is notched, the efficiency will also be particularly good. However, this kind of assembly very poorly supports an axle spread, which would vary with the vibrations of the engine.

Note that this kind of transmission does, however, quite well support small defects in the parallel alignment of the axes.

The idea is therefore to insert, as close as possible to the pulleys, a kind of connecting rod that is elastic torsion-wise, between the secondary axis and the axis of the engine.

Thus, the axle spread is kept almost constant and the engine can oscillate about its axis and vibrate in all directions, by imposing on its axis a movement on a sort of cone.

In addition to the degree of freedom allowed, the system is reinforced by the addition of the gyroscopic inertia of the engine.

Moreover, it may be advantageous to rigidly fix the engine to the connecting rod and allow only the rotational freedom of the connecting rod about the secondary axis. Thus, the moment of inertia of the engine is increased without its mass having to be increased, which is beneficial to the cycle vibrations.

Finally, it will be beneficial to place said connecting rod in the axis of one of the directions in which the motor vibrates least.

Since the first stage is the noisiest, this connecting rod can form a soundproofing casing that will be designed to have a weak rigidity torsion-wise.

This solution is applicable to a pedal engine block version, provided that the engine is sufficiently narrow not to destroy the ergonomy of the bicycle. However, this solution will, despite everything, be unfavorable in terms of residual vibrations transmitted to the pedals and in terms of sound emissions, because the body of the cyclist cannot then screen the noise.

From a vibratory and sound point of view, there is a great benefit in fixing the reducing gear, and therefore indirectly the engine, to a portion of the frame that will receive the saddle tube and more particularly between this tube and the rear wheel.

This solution makes it possible to distance the vibration generator from the nerve centers that are the handlebar and the pedals. Moreover, the saddle and its tube constitute excellent vibration absorbers. In this area, the silicone gel-based saddles offer a gain of the first order.

This arrangement makes it possible to place the engine behind the saddle and, in this case, the body of the cyclist will offer a phonic screen of high quality, totally free in terms of cost and weight. Other benefits of this arrangement are the absence of heat release to the cyclist and an improvement in the work of the suspensions, if the bicycle is equipped therewith, by the increased moment of inertia of the frame.

This solution calls for the movement to be taken fairly far from the engine toward the pedal or to the rear wheel; see U.S. Pat. No. 3,280,932.

In the case where the movement is transmitted to the pedal, the reducing gear will, with difficulty, include fewer than three stages. (Excluding the solution from the U.S. Pat. No. 5,076,386.)

One of the best solutions combining our objectives of damping, flexibility, efficiency, cost, lightness, silence, maintenance, to distance the movement so far from the engine is to use notched belts.

Unfortunately, this will be fairly difficult for the last stage for reasons of bulk, unless the engine is genuinely a very low power engine. For this last stage which rotates very slowly, the chain is a good compromise, especially if it is in a casing.

However, the notched belt combines all the advantages for the second stage or for the second and third stages if the reducing gear has four stages, which may be necessary if the engine is very fast.

Although this or these intermediate stage(s) are slower and therefore less noisy than the first stage, there is great interest in placing them under a casing.

An appropriate arrangement may make it possible for this casing to fulfill multiple functions. Thus, this casing can serve as an engine mounting, soundproofing for the transmission, mudguard, baggage holder, exhaust muffler support, and, above all, air box for damping the intake noises of the engine. And it is obviously on this casing that we will have an interest in placing the maximum of accessories so as to facilitate the work of the elastic engine fixings. These multiple functions are, of course, all to the benefit of the overall mass of the bicycle.

Beyond the movements of the engine, the engine casing itself is a generator of sounds and it will be very difficult for us to reduce them sufficiently, without a soundproofing hood.

In a particular manner, the double jacket of an engine with liquid cooling is already a very effective phonic insulator, highly recommended for our application. This arrangement also allows for a complete encapsulation of the engine, which is a huge asset. However, it is possible that this solution may not be economically viable. In this case, cooling by oil circulation may be an advantageous alternative.

However, it is probable that the cooling will simply be by air. In this case, the hood must take up the challenge of allowing the air to pass and blocking the sounds as much as possible.

By its design, our vehicle can move at full power, at very low speeds, and it is not reasonable to cool it by the air stream due to the speed of the apparatus, except in the case of very much overdimensioned liquid cooling.

In its simplest version, the cooling will be by pulsed air via a turbine driven directly by the engine. This penalizes the efficiency of the engine in all circumstances and it is preferable for this take-off to be effective. For this, it is important for there to be as little recirculation as possible between the cold air inlet and the hot air outlet. Moreover, it is preferable for these orifices to be directed toward the rear of the vehicle so as not to emit too much noise to the user. We will see in a preferred solution that the hot air outlet can be made through a baggage-holder beam which is itself formed by the engine mounting. This arrangement makes it possible to effectively segregate the streams in this turbulent area of the bicycle.

In the case where the engine mounting is not used to guide this stream, it will be advantageous to effect this hot air outlet through a duct a few centimeters long, so as to direct, in a laminar fashion, the hot air stream away from the cold air intake. Turning the cold air intake toward the rear of the vehicle may seem highly detrimental for the air flow rate, but in reality the dynamic pressure of the air at the usual speeds of a bicycle is truly low. Also, there is in any case a great interest in directing the sound waves as much as possible toward the rear of the bicycle.

The casing that guides the cooling air from the fan to the hot portions of the engine will already be treated as a noise attenuator, but it is difficult not to fix this casing to the engine, and the latter will therefore vibrate and generate noise.

The anti-noise hood will therefore preferentially not be fixed to the engine and will be sufficiently far from the engine for the latter not to touch it in its movements. Its mass will in this case reinforce the mass of the bicycle in the filtering of the vibrations.

It is through the air inlet and outlet orifices of this hood that a large proportion of the sound waves from the engine will be able to escape, the engine probably being the major noise source of the bicycle. It is possible to attenuate this noise with a small pressure drop, by placing a structure with slender cells in these orifices. A honeycomb structure will give excellent results for a very low cost and weight. The shape of the section of the cells is of little importance, the bore can even be delimited by narrowly spaced parallel plates. The surface area and the length of the bore sections are, however, of prime importance. A compromise will be found between pressure drop and sound damping.

This structure may be a first order heat exchanger and it may be made up of the engine's liquid cooling radiators, if the latter is equipped therewith. This constitutes an alternative to the complete encapsulation of the engine in the case of liquid cooling.

Note that a certain heat will prevail under this hood, regardless of the cooling mode. This heat will have a beneficial effect for restarts of the engine, which is often switched off based on this concept. However, it can hamper the operation of certain accessories, such as the ignition coils and above all the carburetor which then risks vaporizing the fuel, which is extremely harmful for startup. Hence a second interest in placing these accessories on the engine mounting and if possible in a cool place.

This hood will advantageously be packed internally with a sound damping material. It is worth noting the surprising effectiveness of wool felt for the frequencies usually encountered with these small engines. Some portions of the cover may have a liquid tank function. The mass of the liquid will increase the inertia of the cover. Also, the double jacket effect will be a particular soundproofing effect.

Reducing Gear:

Reduction is an important subject in this concept; to benefit from the change of speed of the bicycle, it is essential to provide a junction of two power sources that operate at very different speeds. This can be done somewhere between the pedal and the rear wheel, and the area has been fairly well explored in the prior art.

Certain arrangements make it possible to have a slightly smaller reduction ratio; see U.S. Pat. No. 3,280,932, U.S. Pat. No. 2,596,391, EP 0 822 136 A2, FR 535 184, U.S. Pat. No. 2,331,976.

A maximum reduction ratio is necessary if we want to make a junction on the pedal, which is not very favorable in terms of weight and cost. However, this arrangement allows the manufacturer great freedom concerning the choice of type of change of speed, which can, for example, be epicycloidal in the wheel hub, more conventionally with dérailleur, or a combination. Generally, this architecture will be compatible with most of the ratio changing systems, which makes it possible to create a large family of bicycles with one and the same assistance.

Moreover, this choice leaves great freedom for the design of the suspensions, which is not necessarily the case with the other solutions.

This reducing gear must have a good efficiency, be silent, if possible reversible (which makes it possible to run backwards), be light, economical and capable of damping the cycle vibrations. It also needs to fit on a bicycle without destroying its ergonomy. Note that, at the outlet, its torque may exceed 10 kgm.

Its design would be simpler with a slow engine, but the many compromises needed to develop the bicycle will probably lead to a maximum power speed of between 6000 and 10 000 rpm, which dictates a high reduction ratio.

If the efficiency is disregarded, the worst solution is the gear train which will be heavy, costly, noisy, will not damp, unless a damper is added which further adds to the weight of the solution.

The major difficulty of this design is that we envisage sound levels for two wheels with heat engine that are hitherto unknown. The gear trains, even straight ones, are usually very suitable for a moped. Here, their use is undoubtedly possible but with production qualities that cannot necessarily be envisaged.

For the first stage, the least noisy solution is the multi-V flat belt, but it does not support the instantaneous power variations due to speed changes well and it must be overdimensioned. These belts can, at the limit, act as a torque limiter with an appropriate tension, but the slipping generates a noise that is difficult to deal with and it considerably limits the life span of the belt. Moreover, the efficiency is less good than that of the notched belts, especially if a tensioner is added, which is difficult to avoid. Some trapezoidal belts with a very small section can also be wound on very small-diameter pulleys and can be used, but they are in fact very close to the multi-V flat belts, which are also belts with oblique contact.

There is a notched belt in the U.S. Pat. No. 5,361,863 for the transmission of the movement without reduction from the motor to a centrifugal clutch, in order to move the clutch from the engine to the reducing gear and probably thus save a few centimeters of width. For a strange reason (probably to keep an identical speed), it is clearly described that the reduction originates from the other stages. This transmission therefore does not seem to be a first reducing stage, but a coupling.

The notched belts are full of advantages for the reducing gear, lower noise than the gear train, cost, lightness, absence of servicing, abrasion resistance, damping and efficiency. Despite everything, their noise is not negligible at high speed, which is above all difficult with the first stage. Certain arrangements are therefore de rigueur, if a very low sound level is the aim.

The noise from a notched belt depends mainly on its linear speed and the tooth volume. We therefore have an interest in having the drive pulley as small as possible, which, given equal reduction, also leads to a weight saving. The pitch will advantageously be less than or equal to 5.08 mm and the quality of the belt will be as good as possible, so as to be as narrow as possible for the power to be transmitted. Some silent versions have indeed emerged.

Despite that, except with a very slow engine, the first stage soon becomes one of the main noise sources of the bicycle.

The first measure is to place this stage under a casing, this casing can have the role described in the vibration section. This casing can also be located under the engine soundproofing hood.

In most cases, above all if the torque limiter is effective, it will be possible to use a pitch less than or equal to 3, which is highly effective. It will also be possible to hollow out the bottom of each tooth on the pulleys, with an air evacuation groove. Similarly, it will be possible, without affecting the primitive diameter, to eliminate a certain tooth ratio on the large pulleys, because the latter have a large number of teeth engaged. Another arrangement is to place two narrow belts side by side, or to provide a central notch, a little deeper than the teeth, on the perimeter of the toothed wheel. All these measures reduce the speed of the air expelled and sucked in by the belt teeth.

Note that the large primary transmission pulley is a position of choice for the torque limiter. Moreover, this position enables the limiter to receive a torque that is already slightly smoothed by the flexibility of the first belted stage.

Note, too, that this primary transmission will be one of the elements most eccentric relative to the median plane of the bicycle, and it is important for it not to hamper the cyclist in his movements. We will see in the layout section that it can be placed in positions that offer little hindrance, or that the engine can be laterally offset to allow the transmission to extend less from the median plane.

Finally, this primary transmission can be a belted angle transmission.

The technique consists of carefully placed rollers that enable the belt to twist and form a right angle. This arrangement fatigues the belts but allows a longitudinal arrangement of the engine, which enormously simplifies the layout of an engine which will have to include many accessories on its shaft and which will therefore be made narrow only with difficulty.

This solution is compatible with the anti-vibration arrangements described previously.

The second stage is much slower and poses fewer noise problems. Although the torque is stronger, the notched belts still combine a large number of qualities for this work. And in the preferred arrangement, they additionally allow for a significant axle spread, which facilitates the transport of the movement to the pedal which is fairly distant from the engine. A pitch of 5 or 5.08 will be particularly silent for this work. This belt can operate in the open air, but it would then be a little more noisy and vulnerable to splashes of water and mud, or branches in all-terrain situations, which may be detrimental to operation. We have seen that there is great interest in placing this stage under a sealed casing and to use this casing for many other functions, including air box for the engine. In this case, we have an interest in placing two air filters, a large one at the air inlet of the casing and another between the engine and said casing.

Sometimes, it may be necessary to use a four-stage reducing gear, and in this case the work of the third stage will advantageously come within the same context.

Note that, in the case of an engine-reducing gear-pedal block, the notched belt solution for the intermediate stages presents fewer advantages, the significant center-to-center distances of the solution and the great width increasing the bulk. However, the flexibility, the silence, the cost, the lightness and the absence of servicing, despite everything make it a very good solution. This solution is even better when the engine sucks into the casing of these belts, which genuinely constitutes a very good sound damper.

We will return to the subject in the layout section and in a particular embodiment.

For the last stage, and above all if we transmit the power to the pedal, the movement will be very slow in the regions of 100 rpm at maximum speed, and the torque will therefore be very great.

At such low speed, the chain offers numerous advantages in terms of lateral bulk, weight, cost, resistance, possible reduction ratio, efficiency and even damping. However, it demands a system for adjusting its tension, it quite poorly withstands abrasion, bad weather, and must be lubricated. At the low speeds concerned, it can be very silent.

One of the greatest advantages of the chain is that it can operate on pinions of very small size, in some cases, it is possible to go as low as seven teeth. And if this characteristic is allied with a small pitch and a belt the size of the chain ring of the bicycle, the last stage can offer a considerable reduction ratio that can more than exceed 10. This can be very useful on the project, above all for the production of budget versions. This characteristic has its limits in our case, because a ratio of 10 means that the small pinion will rotate at approximately 1000 rpm and at this speed, its noise will not be negligible.

Moreover, the small pinions have a polygonal effect which increases very quickly with the reduction in the number of teeth. This polygonal effect destroys the usually good efficiency of the chains and the deflection of each link leads to rapid wear of the chain. This polygonal effect also generates harmonics in the transmission that will test the transmission of the bicycle and generate noise. A compromise is therefore necessary and it will be preferable to have a small pinion of more than 9 teeth if possible. In all the cases in point, there is a great interest in spreading these vibrations. This can be done fairly simply with a ring gear made of plastic material and appropriate openings. The longevity of the small pinions may be increased by a tensioner on the slack side, which increases the number of teeth engaged. The slack side never works on this concept, this tensioner can be automatic, based on elastic pressure.

The choice of double or triple chain makes it possible to reduce the pitch of the chain, which allows, with equal reduction, pinions with more teeth and this is all to the benefit of the efficiency, longevity and silence.

We note the existence of a simple chain, specially for go-karting, that is particularly well suited to our case with a pitch of 7.6 mm; this chain allows for a high reduction ratio and, from its great width, offers an astonishing resistance for very low weight.

Another advantage of this type of chain is that it is also available in a lifetime lubricated sealed version which is far more resistant to abrasion. These qualities are paid for by a slight drop in efficiency and an extra cost.

For reasons of longevity and safety, it will be advantageous to place these chains under a protective casing, if possible sealed and capable of containing oil.

The chains are therefore interesting from a bulk, cost and reduction ratio point of view, but they are not without defects. Nor are the solutions based on gear trains.

In some cases, when the layout and power permit, the notched belts can also take over the final reduction task. At such low speed, they are particularly silent, but their low resistance to tearing and to jumps of teeth dictates a large belt width and a large number of teeth engaged. The reduction ratio will therefore be fairly low, which will transfer the reduction issue to the other stages, of which there will then doubtless be 3. At such low speed, the notched belt even becomes fairly heavy per Watt transmitted. However, this solution is clean, servicing-free, fairly economical, very silent, flexible and presents less danger to the user. Their use is therefore not without advantages.

This solution can also replace the chain in our preferred version, when the torque and layout permit.

We will see later an engine-reducing gear-pedal block version, totally based on notched belts.

In the case where the aim is a highly compact engine-reducing gear-pedal block, it will be possible to use gear trains preferably with oblique disks for the final stages, which are the slowest. If the reducing gear has four stages, the second fairly rapid stage can use a large pinion made of plastic material so as to reduce the noise.

Another solution is to give a high reduction ratio to the first belted stage so as to greatly diminish the speed in the gear train stages, of which there can then be 2. This solution may be highly compact if the large pulley necessary for the first stage is concentric to the bottom bracket axle and placed on the side opposite to the bicycle transmission. This large pulley transmits its movement into the reducing gear casing with gear train through a spacer that rotates about the bottom bracket axle.

Despite their first belted stage, these two solutions will offer less damping of the cycle vibrations, which will fatigue the transmission of the bicycle more. The fitting of an additional flexible element into the kinematic chain will then be strongly recommended.

In the case where the change of ratio is effected with an epicycloidal hub, the chain can also be replaced by a notched belt.

The U.S. Pat. No. 3,280,932 describes a solution in which the power junction is effected on the epicycloidal hub of the rear wheel. The benefit of this junction is that it demands a lower reduction ratio, that can be achieved in only two stages. It is obvious that the relevance of this solution can be greatly enhanced by all the arrangements described previously. Similarly, it might be advantageous, in an embodiment with rear suspension, to place the intermediate reducing shaft in the axis of the articulation of the trailing arm, so as to be able to fix the engine to the frame and thus reduce the suspended masses.

The reducing gear can also be hydraulic, and in this case the engine drives a pump, and a slow hydraulic engine transmits the movement to the pedal or to the wheel as in the U.S. Pat. No. 3,280,932. So as to be a little lighter, the hydraulic engine can possibly transmit the movement through a mechanical reduction stage. The torque limiter can be a pressure relief valve. This attractive solution, which greatly simplifies the layout, will probably be fairly costly and of a fairly low efficiency and not necessarily be very silent.

Layout:

Since our aim is not to create a moped on which it is possible to pedal, but indeed to create an effective bicycle with assisted pedaling, it would be fairly unfortunate for some mechanical members to degrade the ergonomy of the bicycle.

The main difficulty stems from the area swept by the feet and the legs of the cyclist when pedaling, which is considerable, and which we will call pedaling area. This pedaling area covers almost all the surface area of a conventional horizontal tube frame, apart from a small surface area behind the stem. With large feet, the heels almost touch the rear fork. We can define a volume swept by the feet and the legs of the cyclist when pedaling, and we call it pedaling volume. No element should be located within this volume. The pedaling area is in fact the projection of the pedaling volume onto a plane that is vertical and longitudinal to the bicycle.

For good ergonomy, it is essential for the legs to work in two parallel planes. And since it is not easy to widen the user's pelvis, this means a separation of the crank arms relative to the median plane of the frame whose values must be contained within a very narrow range, unless painful and ineffective pedaling is accepted.

Without going as far as adapting this value to the width of the pelvis as some professionals do, a value of 100 mm between the outer face of the crank arm and the median plane is considered to be the extreme limit of what is tolerable for an average body.

Moreover, many countries impose a minimum ground clearance angle for bicycles, with the pedal in the bottom position, in order to avoid contact between the pedals and the ground when the pedals are turning. And it goes without saying that a great clearance of the pedals means placing the pedal higher and therefore the saddle also, which soon leads to it being impossible to place the feet on the ground when stopped. And this detail is not without importance on a bicycle which may be designed for urban use.

Again for reasons of ergonomy, the modern crank arms are no longer straight (perpendicular to the bottom bracket axle) but oblique. The aim of this obliqueness is to avoid the ankle rubbing against the outer face of said crank arm. If this obliqueness and the minimum thickness of the pedal at its fixing on the bottom bracket axle are taken into account, we find ourselves at best at a distance of 65 mm from the median plane, which leaves very little space for the layout of a mechanism. This small value, which leads to an offset of 100 mm, which is already poor from an ergonomy point of view, is valid only for the left side.

On the transmission side, the problem is reinforced by what is called the chain line. If the bicycle is equipped with standard wheels, the median pinion, if it is a 9-pinion wheel, is located 45 mm from the median plane and it is at this distance that the average chain ring gear of a triple chain ring gear must be placed. This distance is what is called the chain line and its objective is to try to limit the obliqueness of the chain on the opposing pinions and chain rings. Obviously, a double or single chain ring gear must also be centered on this chain line.

All this leads to a distance of approximately 35 mm between the chain on the small chain ring gear and the median plane, a distance from which there must also be subtracted a few millimeters for the passage for the change of chain rings.

It would, moreover, be particularly regrettable not to observe the chain line on a design in which the chain will have additional work to carry out.

These constraints make the layout extremely difficult and they will be further supplemented with others. We can already see that the space for locating an engine-pedal block will be more than has been calculated.

From this point of view, we note the astute design of the patents GB 637 014 and U.S. Pat. No. 2,596,391, which have made it possible to contain the pedal offset within reasonable values, by virtue of an ingenious pedal reducing gear and crank arms that are in this case straight. However, these embodiments do not include any centrifugal clutch, nor forced cooling, the multiple chain rings are impossible and the noise is not a concern.

The chain line may be a little more favorable in the case of a transmission with epicycloidal hub. However, it would be regrettable to design an assistance that can function only with this type of ratio changing.

By departing from the current standards, when it comes to wheels, it is possible to save a few millimeters on the chain line, with wheels that are wider at the hub than the current 135 mm. This saving, bounded by the ergonomy limits described previously, would, despite everything, be a great advantage in our case. In any case, a width of 150 or 160 mm should be possible.

In other points of the pedaling area, the space is even more reduced, because it is then necessary to add morphological peculiarities: knock-knees, thick calves, projecting ankles, large thighs, small pelvis.

Only two placements are easier, the engine can easily be located between the stem and the passage of the knees or behind the saddle.

The first placement had its glory days at the start of the century and after the war. It is the placement that offers the easiest layout whether for the engine or for its reducing gear, whether the movement is transmitted to the pedal or to the rear wheel.

However, the engine is positioned at the front seat, to diffuse noises, vibrations into the handlebars, heat and possibly smells to the user, and the ease of layout is paid for dearly in terms of inconveniences to the user.

The second solution is not without drawbacks, the baggage holder will lose a certain volume, the engine can be a hindrance in certain extreme postures used in very steep descents when the cyclist retracts his buttocks beyond the saddle, and finally the use of a baby seat will be problematic.

A motorbike approach might raise fears of raising the center of gravity too high. In fact, this rather gives a certain stability to a vehicle which is fundamentally lacking therein.

Although the layout of the engine is fairly easy behind the saddle, the transmission of the movement to the pedal is not simple because it must run in the pedaling area through places where the space is most restricted. Moreover, the probable presence of forks will considerably amplify the difficulties for the passage of the movement.

Only the U.S. Pat. No. 5,941,332 seems to have circumvented these difficulties by the use of a flexible cable and an engine with longitudinal axis, but with the drawbacks described already.

On the other hand, this rear arrangement makes it possible to place an engine of fairly large dimensions with no particular difficulty in routine use. It distances the vibration generator from the handlebars and from the pedals and eliminates all the heat nuisances. It also makes it possible to have the engine with a transverse axis, with the advantages that have already been seen.

However, above all, with identical technologies, the engine behind the saddle gives a considerable advantage over the other solutions when it comes to noise.

This solution can be accompanied by a bicycle frame that is very conventional in its conformation, which is not the case with an implementation based on engine-reducing gear with pedal.

To describe the difficulties to be overcome, we will begin with the arrival of engine power at the pedal.

It is tempting to have this power arrive on the side of the transmission of the bicycle. This is, moreover, what the predecessors have done, as is known from the U.S. Pat. No. 4,397,369, U.S. Pat. No. 5,076,386, U.S. Pat. No. 5,361,863.

This solution is hazardous in more than one respect, firstly we have seen that the chain line leaves very little space available toward the frame, it leaves even less thereof when the presence of the chain stays of the bicycle are considered. As a general rule, the chain stays receive what is called the handle blow, which is a deformation of the chain stay on the transmission side to allow the large chain ring gear to take its place without touching said chain stay. This leaves little space for the transmission of the movement if the aim is to observe the chain line and place the two free wheels necessary to the automatic transition from assisted bicycle to conventional bicycle, while allowing for easy rear pedaling.

The arrival of power via the side opposite to the bicycle transmission demands the presence of a spacer that revolves inside the bottom bracket shell, but this revolving spacer will be difficult to locate in a standard BSA housing, but a slightly larger USA standard housing may be appropriate. The bottom bracket axle can have a rotation within this revolving spacer, for example when wanting to pedal backward, but it will drive the spacer when pedaling forward by virtue of a free wheel. It is also there that the junction between the two power sources is made.

This arrangement allows for the mounting of a ring gear of the same diameter as the large chain ring gear with no drawbacks, the diameter may even be larger if a reduction in ground clearance is accepted. A free wheel will be placed between this ring gear and the revolving spacer so that the pedaling can be done with the engine stopped without driving the reducing gear. Moreover, the space available between the pedal and the chain stay may, in certain cases, allow a transmission by notched belt. This solution leaves the transmission side of the bicycle intact, which makes it possible, among other things, to use multiple chain rings.

For the next stage, which will advantageously be with notched belt, two solutions are possible, the movement can pass into the axis of the bicycle in front of or behind the saddle support tube or on the side of this tube and sufficiently offset not to touch the tire.

Placing this stage behind the saddle tube means elongating the chain stays, so as to leave sufficient space for the reducing gear stage between the saddle tube and the wheel. However, this arrangement is almost necessary on this type of vehicle which will have genuinely surprising crossing capabilities. And without an elongation of the wheel base, it will be quite difficult for the cyclist to keep his front wheel on the ground. The top end of this second stage can be placed in such a way as to allow the arrival of the first stage outside the pedaling area, which is of great interest if the engine is wide. With this solution, the movement will generally pass between the forks, if the bicycle is equipped therewith, unless the latter are positioned particularly low.

It is also possible to place the second stage in front of the saddle tube, but this imposes an arrival of power from the first stage in the pedaling area. This solution will often impose the need for an off-center engine, so that the primary transmission brushes against the saddle tube and any forks. The inverted Y forks are particularly recommended to allow the movement to pass without excessively distancing the primary transmission from the median plane.

The second solution with a second stage on the side of the saddle tube allows for a more standard wheel base, but it is limited in the possible belt width. The situation will be all the more critical if it must also avoid the rear tire which can be wider than the saddle tube.

Generally, the primary transmission, which is one of the members most offset from the median plane, will direct the movement to the pedal and therefore toward the pedaling area. Failing the availability of a particularly narrow engine capable of being located in the pedaling area, an offset engine can make it possible, at the output of the primary transmission, to enter into the pedaling area. This arrangement makes it possible to place the engine just at the edge of the pedaling area, which can present certain advantages when it comes to layout, notably a greater compactness.

So as to limit how far the primary transmission extends from the median plane, when the centrifugal clutch is located on the engine, it will be possible to move the clutch outside the small pulley of the primary transmission. In this arrangement, the bearing of the clutch bell housing is formed by the pulley itself. This assembly makes it possible to save more than 20 mm on the offset, which can be a great help if the transmission needs to come within the pedaling area.

Later, in two particular embodiments, we will deal with the case of the engine-pedal block.

In all the cases in point, the layout of the exhaust muffler(s) will be problematic unless a very high sound level is accepted.

On a bicycle without rear suspension, the exhaust muffler (s) can be in a non-hindering place along the forks. This placement places them outside the pedaling area and directs the noise and heat toward the back of the vehicle, which is ideal.

On a bicycle with rear suspension, the problem is even more difficult, unless a rear-positioned engine is adopted. In this case, the exhaust muffler(s) will be located on the engine mounting behind the saddle above the rear wheel. They can even form the baggage holder provided that they are covered with a thermal protection.

This arrangement behind the saddle tube will still be advantageous with an engine-pedal block, but then the exhaust muffler will be fixed directly to the tube supporting the saddle tube and it will largely occupy the same position as the engine mounting of our preferred embodiment and it can serve as mudguard and even as baggage holder with appropriate insulation.

Assistance Management:

In its simplest version, the user uses a throttle to manage the engine torque and therefore the desired assistance value. This value will not change as often as the power invoked on a moped and a control by rotating handle with automatic return when slowing down is not very recommended. A lever control, arranged so as to be able to be controlled with the hands on the handlebars, stable in the required position, is much more agreeable. This management is not automatic and it requires the throttle to be cut in order to stop. However, the low installed power allows emergency braking without cutting the throttle. The most problematic usage error arises if the engine is stopped at full throttle and it is restarted from stopped without remembering to throttle up from the idling down position. In this case, the bicycle will want to move forward even though that is not what is desired. The problem will be truly a nuisance only if a small gear ratio is engaged, where the motive force of the bicycle may be difficult to counter.

This incorrect use can be made impossible, if the contact breaker can only be actuated when the throttle is cut, or if the contact breaker is actuated by a forced displacement of the throttle control beyond the idling position.

Similarly, the throttle control can be coupled to the braking, an action on one or both brakes provoking a return to the idling position. This can be done very easily if the braking device and the throttle control are mechanically or hydraulically coupled.

When equipped in this way, the bicycle is not really assisted since it can be used on the engine only. However, in reality, stopping pedaling almost always means stepping down one or more ratios and the difference in performance with or without pedaling is such that the bicycle will very rarely be used on the engine only.

According to a more sophisticated embodiment, the assistance is equipped with a throttle, a servomotor and a pedal rotation detector. The user still manages the throttle which defines the assistance torque, but this control is made active only if the pedal rotation detector gives the command to the servomotor to activate the throttle. The rotation detector can distinguish between the two directions of rotation, a backward rotation being likened to stopping pedaling. An additional contact or a mechanical arrangement can allow for a transition to manual mode, a mode that is more effective in certain uses, such as, for example, all-terrain use. Note that the servomotor operates in all-or-nothing mode and, to perform its work, it can, for example, act on the cladding of the throttle cable: by elongating the latter it activates the throttle. It can also form part of the throttle control.

According to an even more sophisticated management mode, the bicycle is equipped with a device for monitoring the torque on the pedals, a rotation detector, a throttle servomotor and an information monitoring unit. Numerous devices allow for the torque to be measured on the pedals, but it may be more simple to monitor the variations in forces exerted by the bottom bracket shell on the frame.

When stopped, the torque can be measured on any angular position of the crank arms, but the acceleration command will be given to the servomotor only when a significant rotation has been registered. Then, the torque will be measured twice every pedal revolution at two precise angular positions and the assistance will be constant between two measurements as long as the crank arms rotate. The throttle will be instantaneously cut if the pedals stop or reverse their direction of rotation. In a still finer management, the measurement is still taken at two precise angular positions, but measurements are taken and recorded over the entire pedal revolution, and on the next pedal revolution, the engine torque may be modified if one of the values varies significantly relative to the preceding revolution. Obviously, the newly stored value will replace the old one. The control unit may also receive other information, such as braking, switch selecting different assistance modes, engine speed, engine temperature, ratio change indication, accelerometer and inclinometer.

At the output, the unit can:

Inform the rider if the engine is running, which is very useful in certain circumstances (in towns, the ambient noise conceals the noise of the engine when idling, and the same when descending).

Switching off the assistance in case of braking, even if torque and rotation are detected.

Giving ratio change indications, or even managing changes of ratio.

Reducing the throttle when a change of ratio to a higher transmission ratio is detected.

Indicating the instantaneous or average power supplied by the cyclist.

Limiting the assistance when the engine is cold or too hot.

Informing on the number of hours of operation of the engine, in order to facilitate maintenance.

Informing the cyclist of his average pedaling rate.

Limiting the maximum speed.

Stopping the engine when a fall is presumed.

The unit can make a detailed diagnosis of the user's pedaling rates, in order to customize the reduction ratio of the reducing gear, for particular pedaling types (very fast or very slow).

The Engine:

We will begin this section with an assumption of external combustion engines, whether steam or Stirling, these engines can offer numerous advantages for our application. Some are self-starting and have a strong torque on startup. Their efficiencies can be very good, especially for the Stirling, they are multi-fuel, their continuous combustion is very clean, they often run slowly, they are very quiet and vibrate very little for certain models (rhombic Stirling, 90° V configuration Stirling, slow steam machine). Some boilers for the steam offer almost instantaneous heating. Unfortunately, their techniques are not controlled, or at least not very well controlled, so their applications will be difficult, which is undoubtedly a great shame.

Internal combustion engines cannot start on their own, so it is not reasonable to stop them each time the bicycle is stopped. Moreover, they cannot supply significant power at their idling speed. A centrifugal clutch or a torque converter (low in efficiency) will enable them to reach a sufficient speed to offer reasonable power. It would even be desirable for the engine to be able to support its full load, during the slipping of the clutch or of the viscous coupling.

A user may want to pedal very slowly continuously. In this situation, a rate of 50 rpm is possible. However, it is difficult to envisage having the centrifugal clutch slip permanently. This clutch must therefore be engaged as late as possible, toward 45 rpm pedaling. To be fairly universal, our assistance must be able to accompany the cyclist up to at least 90 rpm.

This means that the engine must have a usage range of at least 50% of its maximum speed, which is quite large for a single-cylinder.

This constraint has to be supplemented with another which is more difficult to obtain, that of having a torque that decreases over the entire pedaling range. This means that the torque from the engine must be at its maximum when the clutch is engaged and obviously this torque must not drop too quickly to be able to accompany the cyclist to a high pedaling speed.

Failing this condition, the collaboration between assistance and cyclist will not be harmonious.

As an example, on a gradient it will be particularly disagreeable to have to supply an acceleration force to reach a pedaling rate where the assistance will have the desired value. Similarly, when approaching a slope, the assistance will drop with the speed, which will make the slope variation feel much more difficult than it is. This will often mean stepping down several ratios, and then, when the torque speed is restored, we will probably be in over-assistance mode. This leads very quickly to an unstable speed, which fairly soon becomes labored. Also, in this situation, it will be more a case of pedal-assisted motoring than the opposite.

Whereas with an assistance curve that decreases with the pedaling speed, the assistance is reinforced when the pedaling speed decreases, which irons out the difficulties, reduces the number of ratio changes needed and makes riding easier.

In fact, the cyclist will react like an extremely sensitive power bank and the slightest dip in torque will be felt.

To illustrate this transmission a little, if we disregard the noise, an engine that has, for example, a maximum power of 400 watts at 8000 rpm, a maximum speed of 9000 rpm, with a maximum torque at 4500 rpm, a maximum efficiency at 6000 rpm, and an idling speed of 3000 rpm, would be ideal if coupled to a reducing gear of approximately 100/1 and a clutch that engages at 4500 rpm.

Note that such an engine could have a cubic capacity of less than 10 cm³, so it would be particularly light and compact, but its soundproofing and that of the reducing gear would be particularly difficult to obtain at such high speed, for the desirable levels.

An engine that has its maximum power at 4000 rpm, a maximum speed of 4500 rpm, a maximum torque at 2250 rpm, a maximum efficiency at 3000 rpm and an idling speed at 1500 rpm, would also be fairly ideal with a reducing gear of 50/1 and much easier to render silent.

It would, however, have a much larger cubic capacity, be heavier and more bulky. However, a reliable idling at such a low speed will be difficult to obtain on an engine that is to be lightweight. Similarly, it will be very difficult to avoid knocking at the maximum torque speed which is actually very low, unless a very large size flywheel were fitted, which would add much more weight to the solution.

We therefore find that the engine will probably have a maximum power at approximately 6000 rpm which will necessitate a reduction of approximately 75/1 which is considerable and not within the scope of all the technical solutions.

Obviously, it is possible to accept a torque that increases by a few percent after the clutch has engaged, but this will be reflected in an inconvenience of use that will be all the greater when the variation is strong.

This characteristic can also be used to favor average pedaling speeds, which will be all to the benefit of safety and totally within the spirit of the product.

Two-stroke engines will find it very difficult to satisfy these conditions without costly devices, and their polluting emissions and their efficiency may not be good without other devices, also costly. These engines require a highly restrictive mixture of oil and gasoline or an oil pump which is also costly. And even if no regulation requires the engine to be depolluted, two-stroke engines give off fumes which will be highly irritating if riding in a group. Moreover, the aerodynamic turbulences always return smelly fumes to the clothes, which will be impregnated therewith, which is also a major inconvenience, so much so that their use will be difficult or little recommended.

This is a great shame because these engines are compact, very light, generate fewer cycle vibrations, and fewer mechanical noises than four-stroke engines.

The characteristics that we want are, however, fairly easy to obtain with a four-stroke engine, especially if no specific high power is required, which is the case.

In this particular application, the noise and the vibrations are drawbacks of the first order. Moreover, without having a longitudinal axis, the width of the engine will pose significant layout problems. Numerous accessories have to be driven by the engine. In the worst case, the engine must drive a flywheel, an ignition device, a fan, its distribution, an oil pump, a water pump, a torque limiter, a centrifugal clutch, a power outlet, a starter device and an electric current generator, and it is very difficult to produce a narrow engine if all these accessories are located on the engine shaft. There will therefore be great benefit in distributing these accessories over other shafts. We have already seen that the torque limiter can be located on a shaft of the reducing gear, as can the clutch, but with certain drawbacks. Obviously, if the engine is a four-stroke, a cam shaft can be used notably for the water pump. The movement is already reduced and it would be highly attractive to use this shaft as power outlet. We can already find a trace of this technique in the patent FR 535 184. In fact, this possible solution poses as many problems as it resolves and its selection is not obvious.

In our case, the addition of one or more shafts driven by the engine may be a great help for driving accessories.

Moreover, the way the vibrations are treated takes on a particular significance on our apparatus, so there would be a great benefit in equipping our engine with balancing shafts and we immediately see that any balancing shafts can also have a drive function for certain accessories.

From a cost-effectiveness point of view, it is difficult to imagine an engine other than single-cylinder for our application. All the same, we note the clear interest from a vibration and cyclic regularity point of view in 180°-offset flat two-cylinder engines or, to a lesser extent, 90° V configuration two-cylinder engines.

The ideal would be a 180°-offset flat two-cylinder engine with its two cylinders in the same axis, which raises serious problems in the connecting rod design.

We note in this section that a very poor use is always possible (except in the case of speed changes managed by the electronic unit). Thus, an uninitiated person could attack a slope on a very high transmission ratio, with an excessively low pedal rate for the clutch to engage, which would lead after a certain time to overheating and even deterioration of the element. This consequence can be avoided by a thermocontact placed close to the clutch that is capable of stopping the engine in this situation.

Other advantages and characteristics of the invention will become more clearly apparent from the appended drawings, given by way of nonlimiting examples, in which.

It should be noted that, in FIGS. 8 to 13, the crank arms are deliberately represented symmetrical relative to the vertical and longitudinal plane of the bicycle in order to better represent the space available for locating the assistance device without interfering with the movement of the crank arms. The crank arms are naturally normally fitted at 180° from one another.

DETAILED DESCRIPTION OF VARIOUS EMBODIMENTS

Figure 1:
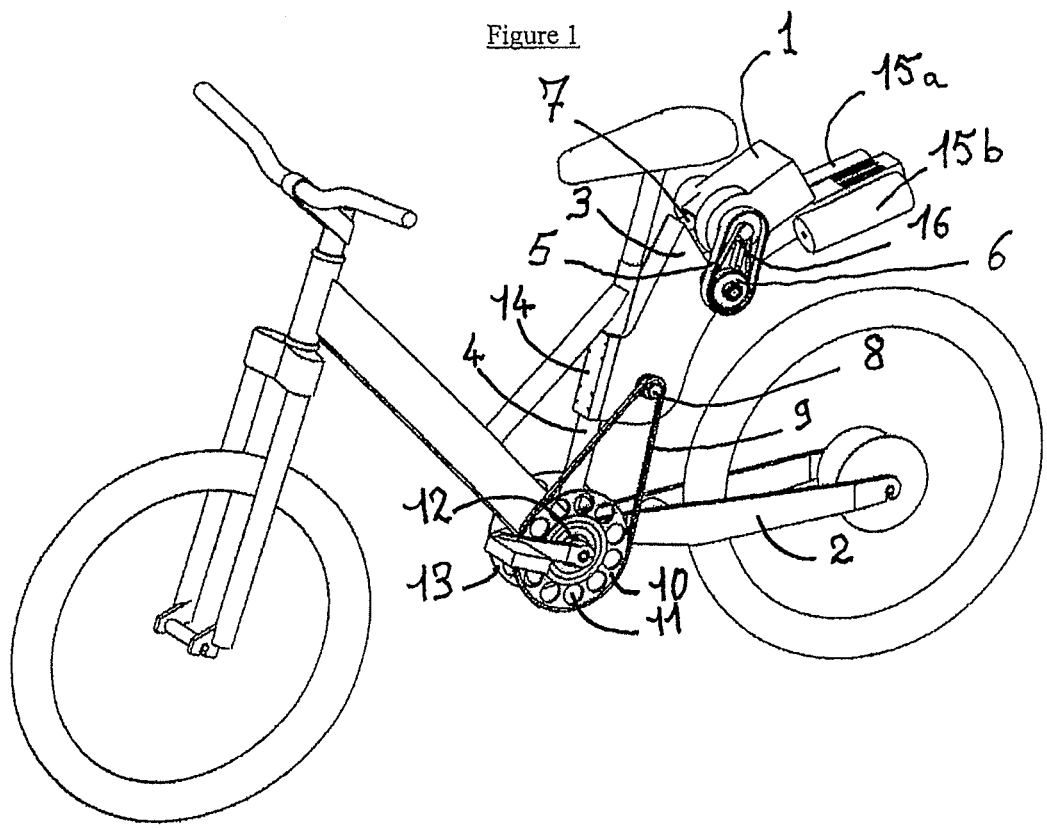
FIG. 1 represents a perspective view from the left of the first embodiment of a bicycle.

FIG. 1 shows a particular first embodiment in which the engine (1) is placed behind the saddle, and the bicycle is of very conventional architecture. Only the chain stays (2) are a little elongated so as to clear sufficient space for the reducing gear casing of the second stage (3). This elongation is also designed to avoid the lightening of the front wheel on steep inclines.

In order to bring the length to a fairly standard value and reduce the forces on the bicycle transmission chain, the wheels have a diameter of 24 inches. In this drawing, the assistance is placed so as to allow for a rear suspension with extensive travel. However, the bicycle could equally be rigid, and in this case the forks will be fixed to the tube supporting the saddle tube (4) and the engine and its mounting (2) will be placed lower.

In this embodiment, the engine (1) and its primary transmission (5) are outside the pedaling area, so that their offset from the median plane has no effect on the pedaling ergonomy. The engine (1) and its primary transmission (5) therefore do not need to be particularly narrow. This detail allows for the mounting of a primary notched belt (16) that is fairly wide, which allows for the use of a pitch of 3 mm which is all to the benefit of silence. Moreover, the width can allow two belts to be mounted side by side or a pulley with central channel to be used in order to further reduce the noise. For the same reasons, it is also possible to crop a certain ratio of teeth on the large pulley while preserving its primitive diameter.

The movement is then sent into the axis of the bicycle on the second reduction stage with notched belt, which is placed in the casing (3) and it is that which will cross any forks. The movement will therefore pass between the forks if the bicycle is equipped therewith.

In this view, the cover of the flexible casing of the primary transmission (5) has been removed so as to show the torque limiter (6), which also serves as a large pulley for the first reduction stage. We can also see one of the elastic fixings (7) of the engine (1). The movement leaves the secondary casing via the pinion (8), which, with the chain (9) and the ring gear (10), constitutes the third and final stage of the reducing gear. This ring gear (10) is in this case made of reinforced plastic material and includes openings (11) intended to make it less rigid, to damp the speed variations of the chain (9) due to the polygonal effect of the pinion (8). The chain (9) is in this case a special go-karting model with a pitch of 7.6 mm. This ring gear (10) is fitted on a free wheel (12), so that the reducing gear is not driven when pedaling without assistance. This free wheel (12) is mounted on a revolving spacer which will transmit the movement to the chain rings (13) of the bicycle transmission.

The secondary casing (3) is fixed to the saddle tube (4) by clamping, using screws that squeeze the part (14). By its deflection, this saddle tube (4) helps to filter the residual vibrations.

We can also see the layout of the two exhaust mufflers (15a) and (15b) on the rear portion of the casing (3), which can in this position find all the space needed without any nuisance to the user.

Figure 2:
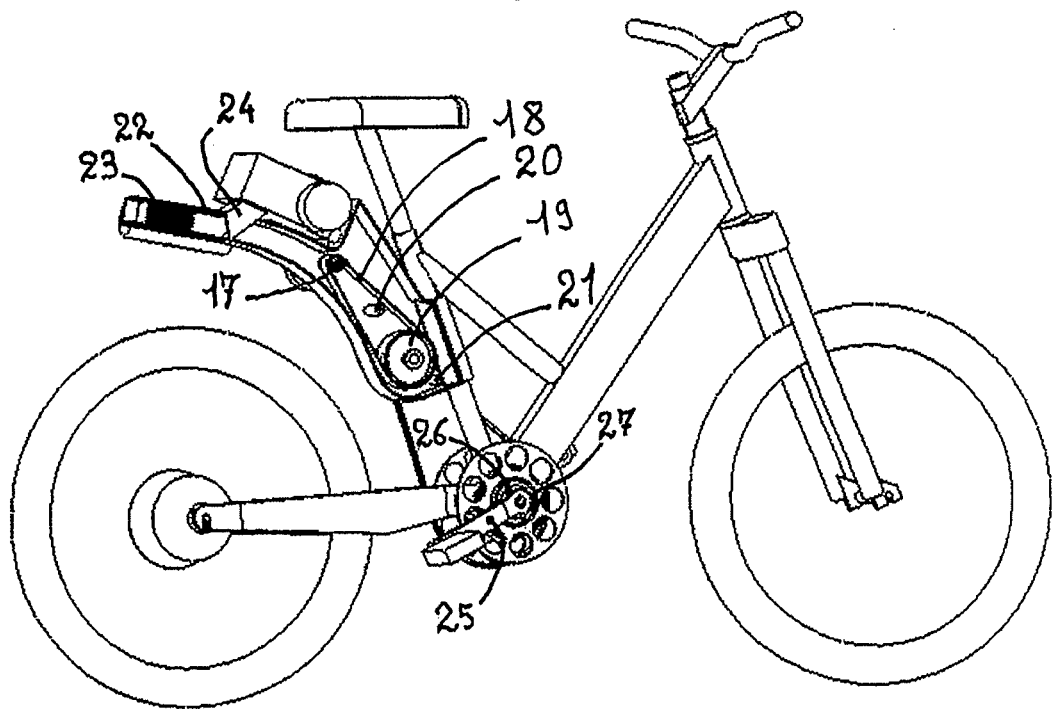
FIG. 2 represents a perspective view from the right of the first embodiment of a bicycle.

FIG. 2 shows a right-hand perspective view of the bicycle, in which the right-hand muffler (15a) and the cover of the secondary casing (3) have been removed. This reveals the layout of the second reduction stage based on notched belt inside the casing (3). This second stage, with a pitch of 5 mm, consists of the small toothed pulley (17), its belt (18) and the large pulley (19). Here too, the width available inside the casing (3) is fairly large and the arrangements already described to reduce the noise of the transmission will be possible. Note that this layout, which allows for the use of fairly wide belts, is compatible with fairly high powers.

In this embodiment, the casing (3) serves as an air box for the engine intake. For this reason, the secondary casing (3) is advantageously equipped with at least one central pin (20), so as to limit the vibrations of the edges of the casing under the effect of the pressure waves generated by the engine intake. The air enters into this casing (3) through a tube (21) whose diameter and length will be defined to attenuate certain nuisance frequencies.

The rear beam (22) of the casing (3) is intended to channel the hot cooling air, and the noise, toward the back of the vehicle and avoid any recirculations of hot air toward the cooling air intake. Also shown in this beam (22) is a muffler (23), in this case consisting of a honeycomb structure, the cells of which are oriented in the direction of the stream. If the engine has liquid cooling, this muffler (23) may be a radiator. The hot air duct (24) has a flexible junction with the engine capable of supporting the vibratory movements of the engine.

Note that this casing (3) will have, for this particular embodiment, the following functions: soundproofing of the second stage, engine mounting, engine intake air box, mudguard, baggage holder, exhaust muffler mounting, hot cooling air outlet orifice and increasing the inertia of the frame.

The right crank arm (25) is equipped with a free wheel (26) which collaborates with a chain ring gear mounting (27), said free wheel enabling the pedaling power to be transmitted to the chain ring gear mounting (27) and the rear pedal. These details are more clearly apparent in the cross-sectional view of the pedal in FIG. 5.

Figure 3:
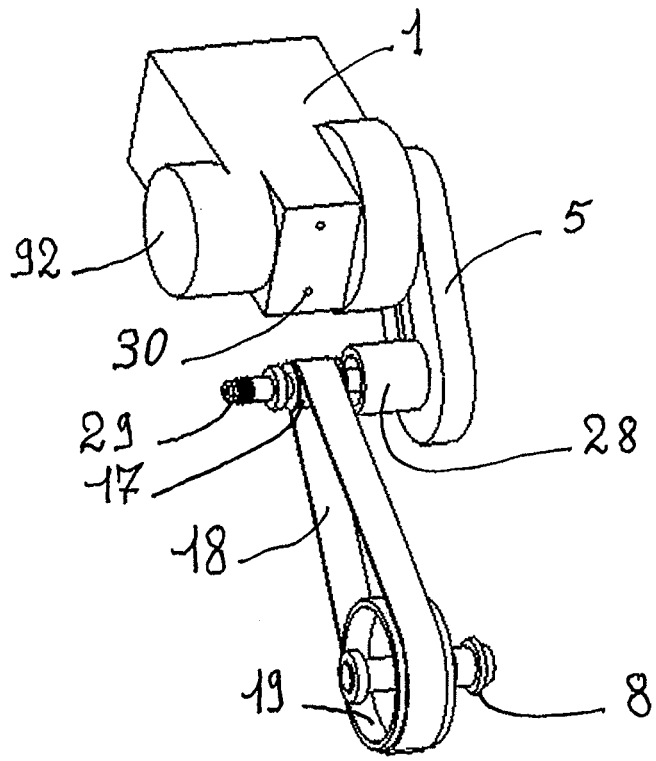
FIG. 3 represents a perspective view of the first two reduction stages of a first embodiment of a pedaling assistance device.

FIG. 3 shows the engine and the first two reduction stages. The flexible connecting rod casing (5) of the primary transmission can be clearly seen here. In the assembly selected for this embodiment, the engine is rigidly fixed to the primary casing (5), because the center-to-center distance of the primary transmission is fairly large. This makes it possible, given equal weight, to increase the moment of inertia relative to the axis of oscillation embodied in the sheath (28) of the casing (5). This sheath (28) is intended to collaborate with a power inlet ferrule of the secondary casing (3), so as to leave the casing (5) and therefore the engine (1) free to rotate relative to this ferrule. The angle formed by this casing (3) with the engine (1) is chosen to correspond to a direction of weak vibration of the engine.

In this case, the engine is mounted only on two vibration dampers, whose fixing holes (30) can be seen. However, the number and the characteristics of these dampers must be adapted to each engine by taking into account the torsion and deflection stiffnesses of the primary casing (5).

This figure shows the adjustment device (29) for the torque limiter, consisting of nuts that squeeze elastic washers. Similarly, the placement of the manual start mechanism (92) for the engine (1) can be seen. This mechanism (92) is a conventional cord starter. The starting handle will advantageously be placed between the saddle and the handlebars using appropriate gears.

Figure 4:
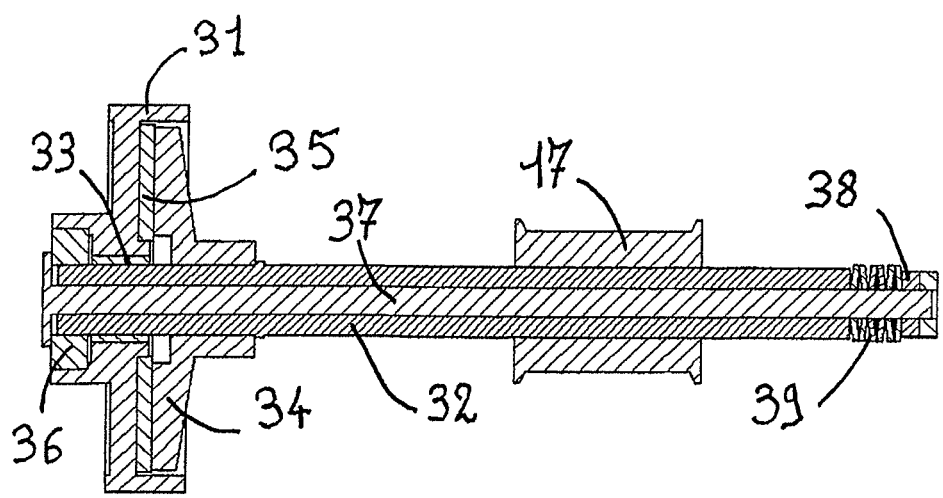
FIG. 4 represents a cross-sectional view of a torque limiter.

FIG. 4 shows a cross-sectional view of the torque limiter (6). The large primary pulley (31) is free to rotate on the shaft (32), by virtue of the self-lubricating bearing (33). The friction plate (34) is fitted clamped onto the axis (32). These two members can be made of a light alloy, but on quality versions, a surface treatment will reinforce the friction surfaces; this treatment can be a hard anodization. The friction packing washer (35) is in this case made of leather so as to obtain a very gentle slip, but other more conventional friction materials may be appropriate. This washer (35) will include holes in the case of leather or radial grooves in the case of rigid friction materials, in order to facilitate cooling and the evacuation of dust. The pulley (31) receives its axial thrust via the rolling bearing (36). In some cases, when the thrust is compatible, this rolling bearing (36) can be a simple ball race with increased play. This rolling bearing will act as a rolling bearing with slightly oblique contact with a significant cost benefit. This rolling bearing (36) receives its axial thrust from a tie rod (37), which is in turn tensioned by nuts (38) that squeeze elastic washers (39) against the shaft (32). The torque-limited movement is then transmitted to the small pulley (17) of the second stage.

Figure 5:
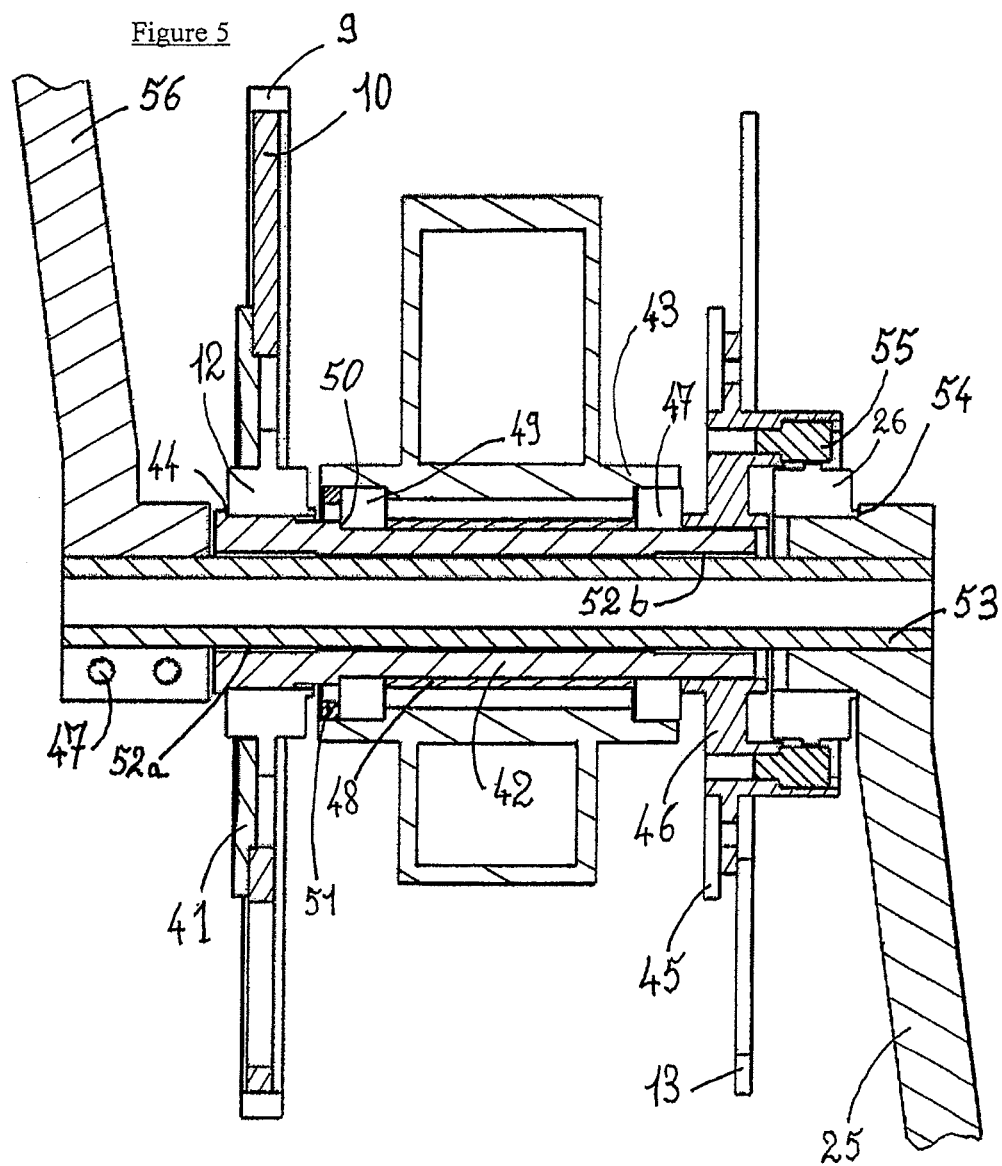
FIG. 5 represents a cross-sectional view of a bottom bracket shell.

FIG. 5 shows a cross-sectional view of the bottom bracket shell. The ring gear (10) through which the power arrives at the pedal is mounted on a free wheel (12), through the intermediary of a ring gear mounting (41). This free wheel (12) is mounted on a revolving spacer (42) placed inside the bottom bracket shell (43).

The proposed assembly makes it possible to use a standard bicycle free wheel. This is of great economic benefit because designing a light free wheel capable of withstanding strong torques is difficult. Here, the link rotation-wise is provided by screwing the free wheel (12) to abut against a shoulder (44) of the revolving spacer (42).

The spacer (42) transmits the movement to the chain rings (13) (45) by a chain ring gear mounting (46). The rotation of this chain ring gear mounting (46) is in this case stopped by left-hand threading on the revolving spacer (42), said chain ring gear mounting (46) abutting against the right-hand bottom bracket shell rolling bearing (47). A spacer (48) takes up the axial clamping force and transmits it to the left-hand rolling bearing (49), which transfers it to the shoulder (50) of the revolving spacer (42). A nut (51) screwed into the bottom bracket shell (43) blocks the left-hand rolling bearing (49) inside the bottom bracket shell.

This arrangement allows most of the chain rings (13) (45) to be mounted, whether single or multiple. Also, the rear wheel can receive a dérailleur, epicycloidal or hybrid ratio changer.

The revolving spacer (42) includes bearings (52a) (52b) intended to allow the rotation of the bottom bracket axle (53) in the revolving spacer (42). The relative movement of the bottom bracket axle (53) in the revolving spacer (42) is occasional, so these bearings (52) can be simple bushings made of antifriction plastic material, or steel bushings packed with PTFE, which is particularly economical and light, and not very bulky.

The bottom bracket axle (53) is in this case force-fitted onto the right crank arm (25). The latter receives a free wheel (26), in this case of bicycle type, screwed to abut against a shoulder (54) of the right crank arm (25).

The teeth or the holes of the ring gear of this free wheel (26) collaborate with the cylindrical screw head (55) joined to the chain ring gear mounting (46) and thus communicates the pedaling torque to the chain ring gear mounting (46). This assembly allows for small defects of concentricity and alignment between the free wheel and the chain ring gear mounting, which simplifies production.

The other end of the bottom bracket axle (53) is splined, as is the left-hand crank arm (56), which also has a clamping device (47). The left-hand crank arm (47) is placed abutting against a friction washer and clamped, which allows for the lateral play of the pedal to be adjusted.

Figure 6:
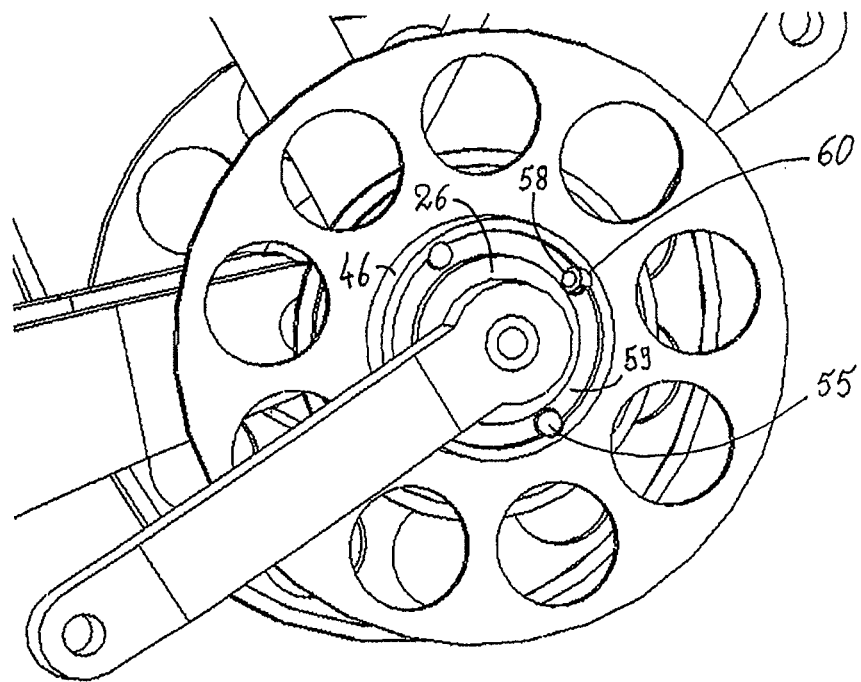
FIG. 6 represents a perspective view from the right of the pedal.

FIG. 6 shows more specifically the collaboration between the free wheel (26) and the chain ring gear mounting (46). Here, the ring gear (59) of the free wheel (26) of bicycle type does not have any teeth, but four holes (58). The chain ring gear mounting has four counter bores (60) intended to receive the cylindrical screw head (55). The head of these screws (55) receives the torque transmitted by the holes (58) of the free wheel (26). The device operates just as well with a ring gear (59) that has teeth instead of holes (58) provided, obviously, that the counter bores (60) correspond to the tooth gaps.

Figure 7:
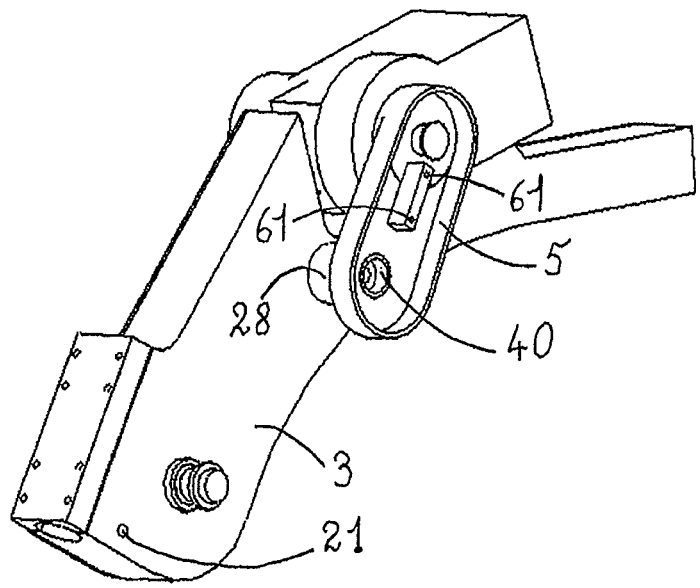
FIG. 7 represents a perspective view from the left of a reduction casing.

FIG. 7 shows the articulation of the flexible primary transmission casing (5) on the secondary casing (3). This articulation works by free rotation of the sheath (28) of the casing (5) on the power inlet ferrule (40) of the secondary casing (3).

So that the primary casing (5) has weak rigidity torsion-wise, the cover of the primary casing (not represented) is fixed by central screws that fit into tapped holes (61).

Also visible is the air suction hole of the tube (21) intended to allow air to enter into the secondary casing (3) for the engine intake.

Some arrangements are not represented, and the centrifugal clutch is placed on the engine so as to be as light as possible. It could be placed on the outlet of the first stage with a greater weight and greater difficulty in production to obtain an accurate sticking speed. The clutch on the primary transmission outlet on the other hand offers a better distribution of weight by lightening the engine and making the engine mounting heavier, which is to the benefit of the operation of the elastic fixings (7) of the engine, and likewise this reduces the width of the engine.

The carburetor, not represented, is fixed to the engine mounting (3), if possible outside the engine soundproofing casing (not represented) and feeds the engine through a flexible duct capable of withstanding the movements of the engine. The length and the diameter of this duct will be tuned so as to favor the establishment of the engine torque at the desired speed.

The air filter will be located between the carburetor and the engine mounting casing (3), so as to protect the engine from releases of fibers and rubber from the secondary transmission. Another, coarser filter may be located on the air inlet orifice (21) of the secondary casing (3) so as to protect the transmission.

The soundproofing engine cover (not represented) will advantageously encompass the reduction primary casing (5), it includes a cooling air inlet directed toward the rear of the bicycle. This air inlet is advantageously fitted with a honeycomb-configuration sound muffler. This could also be a radiator if the engine has liquid cooling. This cover is fixed to the engine mounting (3), it comprises two half-shells fixed to the engine mounting (3) and to each other, using ski boot-type lever fixings. This soundproofing casing is made of plastic foam and includes internal packing of phonically muffling material, in this case wool felt.

The engine will advantageously be equipped with one or two dynamic balancing shafts. Similarly, the cooling will preferably be liquid. Here, the engine continuously drives a fan and the air stream enters into the soundproofing cover (not represented) and leaves therefrom. The engine is therefore not boxed in.

The throttle comprises a hand lever that is stable in the required position, until the brake is actuated. This function is provided by the return force of the brake handle which acts on an element that increases the friction of said throttle hand lever. It is placed on the handlebars above the handle of a brake, preferably on the right.

The contact breaker works on a forced position of the hand lever beyond the idling position.

According to a first variant that is not represented, the large width available on the primary transmission allows for the use of multi-V flat belts. The advantage of these belts is that they can be wound on small diameter pulleys. A tensioning roller may be needed for the tension and to increase the arc of contact of the belt on the small pulley. The efficiency of these belts is less good than that of the notched belts and it will often not be possible to box in the transmission in a non-ventilated casing. In this case, the transmission will advantageously be placed under the engine soundproofing cover. Another solution is to have the engine suck into the primary casing, which constitutes ventilation that is generally sufficient. In this case, a duct will lead the air from the secondary casing (3) to the primary casing (5). In this case in point, the air filter will be moved to an appropriate point to protect the engine from dust.

According to a second variant that is not represented, one of the crank arms receives a disk, in this case made of plastic. This disk can be used to avoid contact between clothes and one of the right or left transmission ring gears. However, its main function is to collaborate with a crank arm rotation detector.

For this, the periphery of the disk includes holes or teeth whose movement and direction are perceived by the detector.

An all-or-nothing servomotor acts on the sheath of the throttle cable. If a rotation of the crank arms is detected in the right direction by the rotation sensor, the servomotor elongates the sheath and thus activates the throttle.

According to a third variant that is not represented, the engine has liquid coolant and the engine is totally boxed in its soundproofing cover. The cooling air stream does not pass under this cover. The radiator that is exposed to the air stream due to the speed of the vehicle provides the normal cooling for the vehicle, but an electric fan reinforces the stream when it is inadequate.

The radiator will not provide any thermal nuisance to the cyclist if it is placed on the engine mounting (3) symmetrically to the primary transmission (5).

In this version, the portion of the exhaust pipe that is under the soundproofing cover is doubled up with an insulating jacket.

According to a fifth variant that is not represented, the chain of the third stage is replaced by a notched belt. The width of this belt is limited by the presence of the chain stays of the frame, so this variant cannot have significant power.

Figure 8:
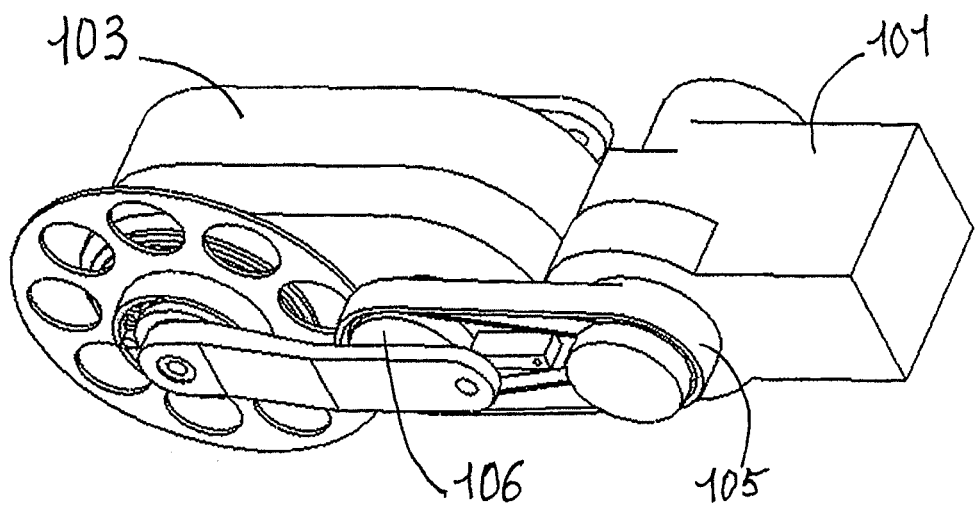
FIG. 8 represents a perspective view from the right of a second embodiment of a pedaling assistance device.

FIG. 8 shows a perspective view of a second particular embodiment in which the assistance consists of an engine-reducing gear-pedal block entirely produced on the basis of notched belts. The engine (101) and its primary reduction casing (105) are in this case placed in the axis of the main casing (103) in order to simplify the drawing. However, it is obvious that the casing (105) and the engine (101) can assume other orientations for reasons of layout or to counter the vibrations. The power enters into the main casing (103) through the side of the chain line, in this case the right side.

This type of assistance is mounted on an unconventional bicycle frame; this frame will notably not have any bottom bracket shell. The main casing (103) will include fixing tabs that are not represented, which will make it possible to fix it to the frame, to receive the elastic fixings of the engine and, possibly, to receive a rear suspension trailing arm. The casing (105) has the same functions as in the first embodiment, and the same applies for the torque limiter (106) that protects the bicycle transmission.

It should be noted that, with this type of assistance, the vehicle bears little resemblance to a bicycle and visually looks more like a moped.

Figure 9:
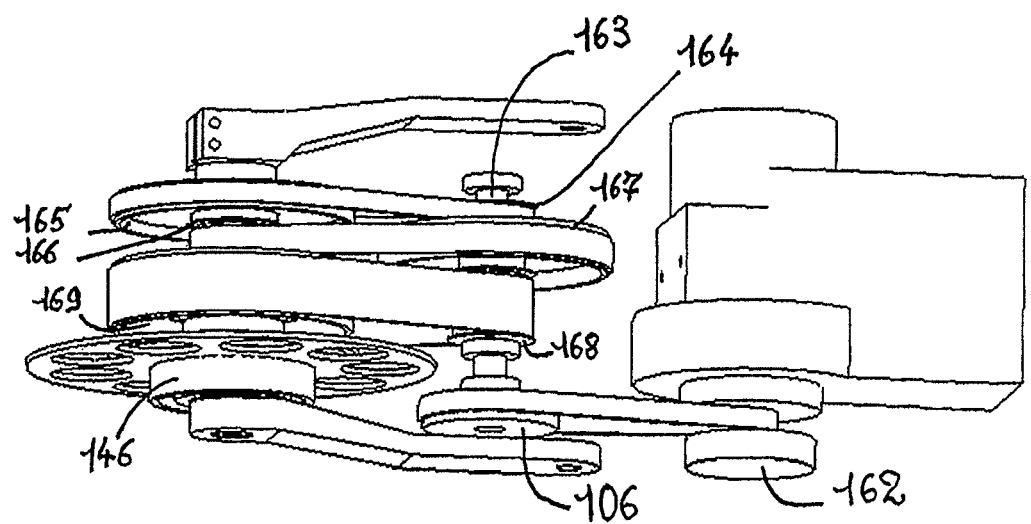
FIG. 9 represents a perspective view of the kinematics of the second embodiment.

FIG. 9 shows the kinematics of the assistance that comprise four stages. Here, the clutch (162) is transferred outside the small primary transmission pulley, which allows for a somewhat larger engine if the engine does not come within the area swept by the crank arms.

The kinematics are as follows: the engine communicates the movement to the clutch (162) through the small primary pulley which is joined to the clutch bell housing and free to rotate about the engine shaft.

The movement then goes to the large primary pulley which also serves as torque limiter (106), which transmits it to the intermediate shaft (163). The movement then goes to the small pulley (164) of the second stage which is fixed to the intermediate shaft (163). Then, the movement goes to the large pulley (165) of the second stage which is joined to the small pulley (166) of the third stage, and the assembly is free to rotate on the bottom bracket axle. The movement then leaves for the large pulley (167) of the third stage, which is joined to the small pulley (168) of the fourth stage. The assembly is free to rotate on the intermediate axis (163). Finally, the movement arrives at the large pulley (169) of the fourth stage which transmits it via a free wheel to a revolving spacer, which in turn transmits it to the chain ring mounting (146). The movement transmitted by the crank arms to the chain ring mounting (146) is effected as in the first embodiment.

In this embodiment, the large and small pulleys can have the same number of teeth and the same pitch, on the last three stages; only their widths change as a function of the torque that they transmit. The reduction ratio is in this case close to 3 for each stage and the selected pitch is 5 mm.

Figure 10:
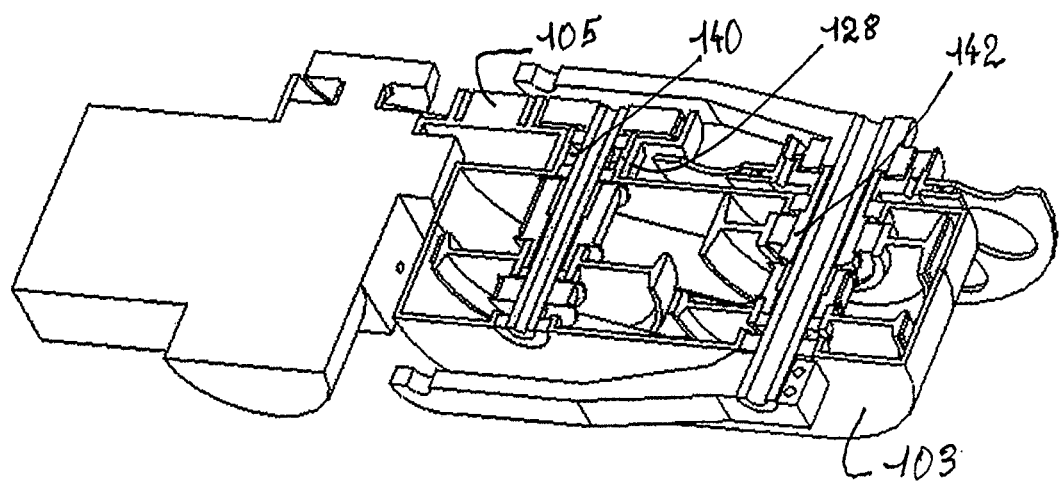
FIG. 10 represents a perspective view in cross section of the second embodiment.

FIG. 10 shows a cross-sectional perspective view of the second embodiment, and this figure shows that overall this embodiment mainly contains air and this embodiment can be very light.

Obviously, the main casing (103) will serve as an air box for the engine intake. For this, all the ball or needle bearings are of the sealed and lifetime lubricated type.

This view shows the articulation of the primary casing (105) through its hollow shaft (128) which can rotate about the power inlet ferrule (140) of the casing (103). The revolving spacer (142) is shorter than in the first embodiment. Despite its four stages, the efficiency is fairly good because most of the friction occurs at low differential speeds and the friction torques are in this case engines on the last three stages.

However, the small width available for each stage will limit the allowable power.

Figure 11:
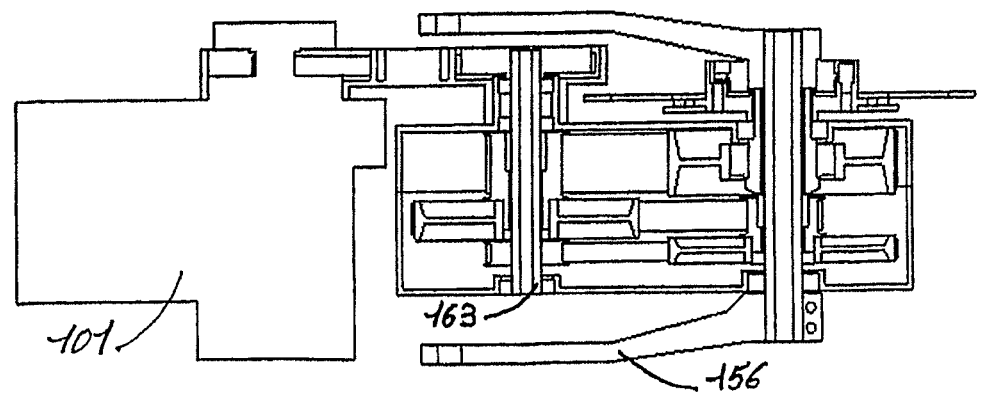
FIG. 11 represents a cross-sectional view from above of the second embodiment.

FIG. 11, in cross section, clearly shows the use of the space available for each function. The cross-section shadings are not drawn to avoid cluttering up the drawing. The joint plane of the main casing (103) is in the axis of the median plane of the bicycle. Here, the drawing limits the crank arm offset relative to the median plane of the bicycle, to a value less than 100 mm described previously in the layout section.

It can also be seen that the engine can be slightly wider if it does not enter into the area swept by the crank arms.

Some layouts even allow it to be placed outside the pedaling area, which allows for an even wider engine, provided that it is off-center.

It can be seen that there is a big space between the intermediate shaft (163) and the left crank arm (156) that is unused. We will see how to optimize this space in the third embodiment, with a solution that is applicable to this second embodiment.

According to a variant that is not represented, the reducing gear casing (103) is partitioned and the last stage uses a chain.

According to a variant that is not represented, the casing is partitioned and the last stage is geared, an additional gear compensating for the difference between axes.

Figure 12:
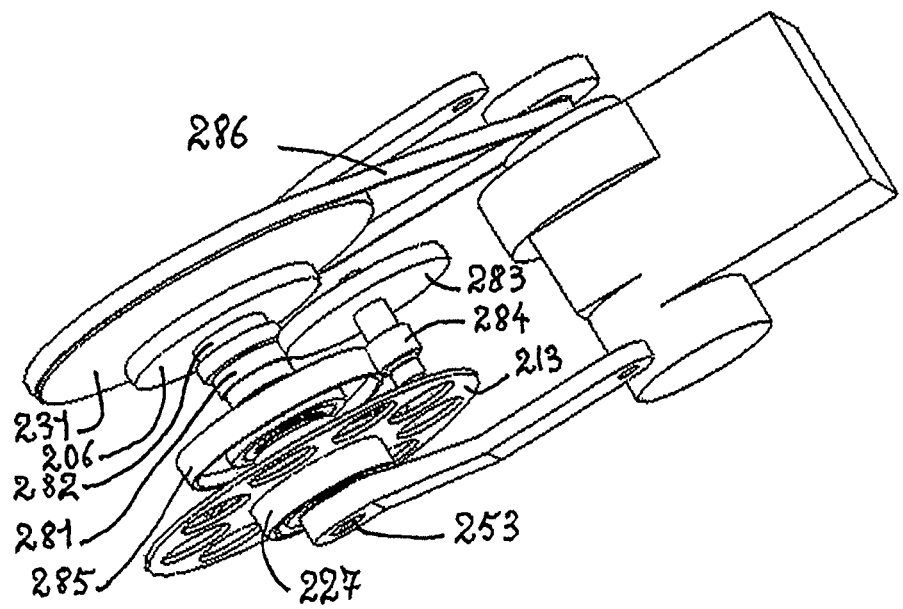
FIG. 12 represents a perspective view of the kinematics of a third embodiment of a pedaling assistance device according to the invention.

FIG. 12 shows a perspective view of the kinematics of a third embodiment, organized as a particularly compact engine-reducing gear-pedal block, consisting of only three reduction stages. The first is belted and the next two are geared.

The main particular feature of this embodiment is that the large pulley (231) of the first stage is concentric with the bottom bracket axle (253). This assembly allows a very large diameter for this pulley which can even exceed that of the large chain ring (213) of the bicycle transmission, if a reduction in the ground clearance of the bicycle is accepted.

This pulley (231) transmits the movement to the torque limiter (206), which will transmit it to the small pinion (281) of the second stage, via the revolving spacer (282). The movement then goes to the large pinion (283) of the second stage, which is joined to the small pinion (284) of the third stage. The pinion (284) therefore transmits the movement to the large pinion (285), which transmits the movement to the chain ring mounting (227), via a free wheel and a second revolving spacer.

The large reduction ratio of the first stage makes it possible to limit the speed and therefore the noise of the following two gear stages. The first belted stage gives a certain flexibility to the transmission to damp the cycle vibrations.

This first stage is in this case produced on the basis of multi-V flat belts. A tensioning roller can be added to allow the tension to be adjusted and increase the winding arc of the belt (286) on the small primary pulley.

This primary transmission will advantageously be placed in a flexible primary casing, as in the other embodiments.

Figure 13:
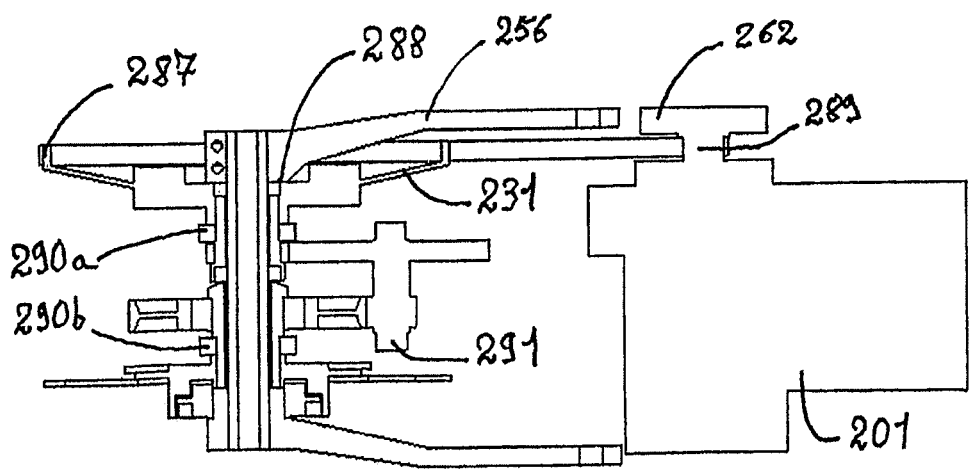
FIG. 13 represents a cross-sectional view from above of the kinematics of the third embodiment.

FIG. 13 shows the kinematics in cross section along a plane passing through the three axes (pedal, intermediate, engine), which in this case are aligned for reasons of representation. A particular arrangement of the large pulley (231) makes it possible to offset its belt path (287) beyond the internal face (288) of the left crank arm (256). This arrangement frees up a lot of space for the layout of the other members and allows a larger width for the engine (201). This arrangement is applicable for the second stage of the second embodiment.

In the figure, the engine (201) does not enter into the area swept by the crank arms and in this case the displacement of the centrifugal clutch (262) outside the small pulley (289) also frees up width for the engine.

The main casing that is not represented supports the pedal rolling bearings (290a) (290b) and the rolling bearings of the intermediate shaft (291) and contains oil. It cannot therefore serve as an air box for the engine.

According to a first variant, the first stage uses a notched belt.

According to a second variant that is not represented, the second and third stages use notched belts.

According to a third variant that is not represented, the very narrow and preferably balanced engine forms a single and rigid block with the reducing gear, of which all three stages are geared, all enclosed within the casing. One of the stages will include a cycle vibration damper.

What is claimed is:

1. A pedaling assistance device for a light vehicle equipped with pedals and a ratio-changing transmission, this device comprising
    a heat engine equipped with a reducing gear mechanically coupled with an element receiving muscular pedaling power from a user of the light vehicle, the mechanical coupling being effected upstream of said ratio-changing transmission in such a way that the heat engine benefits from said changes of ratios,
    wherein the reducing gear of the heat engine includes a first stage that is a belt-based reduction stage having a belt gear connected to an output shaft of the heat engine, and
    wherein the torsion-flexible element keeps the center-to-center distance of two pulleys of the first reduction stage almost constant by allowing the heat engine vibratory movement and the torsion-flexible element is a freely-rotating link rod, articulated about the output axis of the first reduction stage.

2. The device as claimed in claim 1, wherein the engine is free to rotate in the flexible element.

3. The device as claimed in claim 1, wherein the torsion-flexible element constitutes a protection and sound-proofing casing for the first reduction stage.

4. The device as claimed in claim 1, which device is intended to be fixed on a bicycle and able to position the heat engine behind a saddle of the bicycle and above a rear wheel of the bicycle and in that the reducing gear comprises means of routing the power from the heat engine to a peddler of the bike.

5. The device as claimed in claim 4, which device comprises one or more intermediate reduction stages placed under a casing.

6. The device as claimed in claim 5, wherein the casing comprises a sleeve concentric with a power input shaft in said casing, on which is mounted, freely rotating, a torsion-flexible element keeping the center-to-center distance of the two pulleys of the first reduction stage almost constant.

7. The device as claimed in claim 1, wherein the reducing gear comprises a last chain-based reduction stage.

8. The device as claimed in claim 1, wherein the reducing gear comprises a last notched belt-based reduction stage.

9. The device as claimed in claim 1, wherein the reducing gear comprises a last reduction stage with gear trains.

10. The device as claimed in claim 1, wherein the output of a last reduction stage transmits movement via a first free wheel to a spacer concentric to the bottom bracket axle, on which is placed a chain ring mounting of the light vehicle.

11. The device as claimed in claim 1, wherein the reducing gear is intended to be fixed to a frame of a bicycle and able to transmit the power of a heat engine positioned in front of the pedal of the bicycle and in that the reducing gear comprises means of routing the power from the heat engine to the pedal of the bicycle.

12. The device as claimed in claim 1, which device is fixed to a bicycle and able to position the heat engine behind a saddle of the bicycle and above a rear wheel of the bicycle and in that the reducing gear comprises means of routing the power from the heat engine to the axis of the free wheel on the power input of a hub comprising a ratio-changing epicycloidal means.

13. A light vehicle, comprising assistance device as claimed in claim 1.

14. A pedaling assistance device for a light vehicle equipped with pedals and a ratio-changing transmission, this device comprising
    a heat engine equipped with a reducing gear mechanically coupled with an element receiving muscular pedaling power from a user of the light vehicle, the mechanical coupling being effected upstream of said ratio-changing transmission in such a way that the heat engine benefits from said changes of ratios,
    wherein the reducing gear of the heat engine includes a first stage that is a belt-based reduction stage having a belt gear connected to an output shaft of the heat engine, wherein the device is fixed on a bicycle and the heat engine is positionable behind a saddle of the bicycle and above a rear wheel of the bicycle and in that the reducing gear comprises means of routing the power from the heat engine to a peddler of the bike, and wherein the device comprises one or more intermediate reduction stages placed under a casing, and wherein the casing comprises a sleeve concentric with a power input shaft in said casing, on which is mounted, freely rotating, a torsion-flexible element keeping the center-to-center distance of the two pulleys of the first reduction stage almost constant.

15. A pedaling assistance device for a light vehicle equipped with pedals and a ratio-changing transmission, this device comprising a heat engine equipped with a reducing gear mechanically coupled with an element receiving muscular pedaling power from a user of the light vehicle, the mechanical coupling being effected upstream of said ratio-changing transmission in such a way that the heat engine benefits from said changes of ratios, wherein the reducing gear of the heat engine includes a first stage that is a belt-based reduction stage having a belt gear connected to an output shaft of the heat engine, wherein the output of a last reduction stage transmits movement via a first free wheel to a spacer concentric to the bottom bracket axle, on which is placed a chain ring mounting of the light vehicle.

16. A pedaling assistance device for a light vehicle equipped with pedals and a ratio-changing transmission, this device comprising a heat engine equipped with a reducing gear mechanically coupled with an element receiving muscular pedaling power from a user of the light vehicle, the mechanical coupling being effected upstream of said ratio-changing transmission in such a way that the heat engine benefits from said changes of ratios, wherein the reducing gear of the heat engine includes a first stage that is a belt-based reduction stage having a belt gear connected to an output shaft of the heat engine, wherein the device is fixed to a bicycle and the heat engine is positionable behind a saddle of the bicycle and above a rear wheel of the bicycle and in that the reducing gear comprises means of routing the power from the heat engine to the axis of the free wheel on the power input of a hub comprising a ratio-changing epicycloidal means.

* * * * *